(12) United States Patent
Matsuyama et al.

(10) Patent No.: US 8,746,869 B2
(45) Date of Patent: Jun. 10, 2014

(54) INK FOR INKJET RECORDING, INKJET RECORDING METHOD USING THE SAME, INK CARTRIDGE HOUSING THE SAME, AND RECORDED MATTER

(75) Inventors: Akihiko Matsuyama, Kanagawa (JP); Ichiroh Fujii, Kanagawa (JP); Yuuki Yokohama, Kanagawa (JP); Kiyofumi Nagai, Tokyo (JP); Hiroshi Gotou, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 273 days.

(21) Appl. No.: 13/378,432

(22) PCT Filed: Jun. 23, 2010

(86) PCT No.: PCT/JP2010/061086
§ 371 (c)(1),
(2), (4) Date: Dec. 15, 2011

(87) PCT Pub. No.: WO2010/150913
PCT Pub. Date: Dec. 29, 2010

(65) Prior Publication Data
US 2012/0098883 A1    Apr. 26, 2012

(30) Foreign Application Priority Data

Jun. 23, 2009 (JP) .................. 2009-148711

(51) Int. Cl.
*B41J 2/01* (2006.01)
*B41J 2/21* (2006.01)
*C09D 11/00* (2014.01)

(52) U.S. Cl.
CPC .............. *B41J 2/2107* (2013.01); *B41J 2/2114* (2013.01); *C09D 11/322* (2013.01)
USPC ................................ 347/100; 347/96; 347/98

(58) Field of Classification Search
CPC .......... B41J 2/01; B41J 2/2107; B41J 2/2114; C09D 11/30; C09D 11/322; C09D 11/326; C09D 11/54; C09D 11/005
USPC ................ 347/21, 28, 95–100; 523/160, 161; 106/31.13, 31.6
See application file for complete search history.

(56) References Cited

U.S. PATENT DOCUMENTS

| 5,125,968 A | 6/1992 | Takimoto et al. |
| 5,431,720 A | 7/1995 | Nagai et al. |

(Continued)

FOREIGN PATENT DOCUMENTS

| CN | 101368016 A | 2/2009 |
| CN | 101389720 A | 3/2009 |

(Continued)

OTHER PUBLICATIONS

International Search Report Issued Oct. 12, 2919 in PCT/JP10/061086 Filed Jun. 23, 2010.

(Continued)

*Primary Examiner* — Matthew Luu
*Assistant Examiner* — Rut Patel
(74) *Attorney, Agent, or Firm* — Oblon, Spivak, McClelland, Maier & Neustadt, L.L.P.

(57) ABSTRACT

An ink for inkjet recording, containing: dispersed particles A; dispersed particles B; a water-soluble solvent; a surfactant; and water, wherein the dispersed particles A are coloring particles obtained by dispersing an organic pigment in water with assistance of a surfactant, and the dispersed particles B are coloring particles obtained by dispersing a polymer-coated organic pigment in water.

21 Claims, 2 Drawing Sheets

(56) References Cited

U.S. PATENT DOCUMENTS

| | | |
|---|---|---|
| 5,462,592 A | 10/1995 | Murakami et al. |
| 5,514,208 A | 5/1996 | Nagai et al. |
| 5,622,550 A | 4/1997 | Konishi et al. |
| 5,810,915 A | 9/1998 | Nagai et al. |
| 5,879,439 A | 3/1999 | Nagai et al. |
| 5,882,390 A | 3/1999 | Nagai et al. |
| 5,972,082 A | 10/1999 | Koyano et al. |
| 5,993,524 A | 11/1999 | Nagai et al. |
| 6,120,589 A | 9/2000 | Bannai et al. |
| 6,231,652 B1 | 5/2001 | Koyano et al. |
| 6,261,349 B1 | 7/2001 | Nagai et al. |
| 6,613,136 B1 | 9/2003 | Arita et al. |
| 6,637,875 B2 | 10/2003 | Kaneko et al. |
| 6,688,737 B2 | 2/2004 | Nagai et al. |
| 6,695,443 B2 | 2/2004 | Arita et al. |
| 6,730,149 B2 | 5/2004 | Arita et al. |
| 6,730,155 B2 | 5/2004 | Gotoh et al. |
| 6,786,588 B2 | 9/2004 | Koyano et al. |
| 6,899,751 B2 | 5/2005 | Arita et al. |
| 6,918,662 B2 | 7/2005 | Arita et al. |
| 7,033,013 B2 | 4/2006 | Koyano et al. |
| 7,094,813 B2 | 8/2006 | Namba et al. |
| 7,278,726 B2 | 10/2007 | Nagai |
| 7,284,851 B2 | 10/2007 | Bannai et al. |
| 7,370,952 B2 | 5/2008 | Inoue et al. |
| 7,374,608 B2 | 5/2008 | Arita et al. |
| 7,478,902 B2 | 1/2009 | Prasad et al. |
| 7,682,011 B2 | 3/2010 | Namba et al. |
| 7,699,457 B2 | 4/2010 | Namba et al. |
| 7,810,919 B2 | 10/2010 | Kojima et al. |
| 7,812,068 B2 | 10/2010 | Habashi et al. |
| 7,919,544 B2 | 4/2011 | Matsuyama et al. |
| 7,938,527 B2 | 5/2011 | Ohshima et al. |
| 7,950,793 B2 | 5/2011 | Aruga et al. |
| 7,977,408 B2 | 7/2011 | Matsuyama et al. |
| 8,029,122 B2 | 10/2011 | Kojima et al. |
| 8,044,114 B2 | 10/2011 | Habashi et al. |
| 2001/0029273 A1* | 10/2001 | Taniguchi et al. ............ 523/161 |
| 2006/0176349 A1 | 8/2006 | Nagai et al. |
| 2007/0197685 A1 | 8/2007 | Aruga et al. |
| 2008/0036830 A1 | 2/2008 | Natori et al. |
| 2008/0136862 A1* | 6/2008 | Kawabe et al. ................. 347/29 |
| 2008/0233363 A1 | 9/2008 | Goto |
| 2008/0273045 A1 | 11/2008 | Morohoshi et al. |
| 2008/0302268 A1 | 12/2008 | Arita et al. |
| 2009/0041940 A1 | 2/2009 | Yokohama et al. |
| 2009/0047431 A1* | 2/2009 | Hatada et al. ................. 427/256 |
| 2009/0098312 A1 | 4/2009 | Goto et al. |
| 2009/0114121 A1 | 5/2009 | Morohoshi et al. |
| 2009/0130313 A1 | 5/2009 | Ohshima et al. |
| 2009/0162569 A1 | 6/2009 | Morohoshi et al. |
| 2009/0176070 A1 | 7/2009 | Goto et al. |
| 2009/0186162 A1 | 7/2009 | Namba et al. |
| 2009/0234067 A1* | 9/2009 | Kariya ......................... 524/599 |
| 2009/0258196 A1 | 10/2009 | Nagashima et al. |
| 2009/0263632 A1 | 10/2009 | Kojima et al. |
| 2009/0291213 A1 | 11/2009 | Ohshima et al. |
| 2010/0112219 A1 | 5/2010 | Yokohama et al. |
| 2010/0196601 A1 | 8/2010 | Goto et al. |
| 2010/0196673 A1 | 8/2010 | Nagashima et al. |
| 2010/0245416 A1 | 9/2010 | Ohshima et al. |
| 2012/0308785 A1* | 12/2012 | Nakagawa ................. 428/195.1 |

FOREIGN PATENT DOCUMENTS

| | | |
|---|---|---|
| JP | 4 18469 | 1/1992 |
| JP | 2001 98194 | 4/2001 |
| JP | 2002 20664 | 1/2002 |
| JP | 2002 79740 | 3/2002 |
| JP | 2002 86707 | 3/2002 |
| JP | 2004 35863 | 2/2004 |
| JP | 2004 169008 | 6/2004 |
| JP | 2005 41906 | 2/2005 |
| JP | 2005 247968 | 9/2005 |
| JP | 2006-111875 | 4/2006 |
| JP | 2006 160815 | 6/2006 |
| JP | 2008 63546 | 3/2008 |
| JP | 2008 519138 | 6/2008 |
| JP | 2008 213483 | 9/2008 |
| JP | 2008 255241 | 10/2008 |
| JP | 2009 67858 | 4/2009 |

OTHER PUBLICATIONS

Chinese Office Action issued Sep. 3, 2013, in China Patent Application No. 201080028526.0 (with English translation).

* cited by examiner

INK FOR INKJET RECORDING, INKJET RECORDING METHOD USING THE SAME, INK CARTRIDGE HOUSING THE SAME, AND RECORDED MATTER

TECHNICAL FIELD

The present invention relates to an ink for inkjet recording, an inkjet recording method using such ink, an ink cartridge housing said ink therein, and a recorded matter produced using such ink.

BACKGROUND ART

It is known in the art that there is a pigment ink for inkjet recording, in which a pigment such as an organic pigment or carbon black is formed into fine particles using a polymer dispersing agent or surfactant, and dispersed in water.

Also, it has been known that a resin emulsion is added to an ink, in which a pigment is dispersed using a surfactant, for improving abrasion resistance, water resistance and storage stability (see PTL 1).

However, as viscosity of an ink increases when a resin emulsion is added to the ink, it is necessary to reduce pigment concentration, which would jeopardize image density and color saturation of images to be obtained, or to reduce the amount of wetting agent, which would jeopardize jetting stability.

As another example of a dispersion system of an ink, there has been known a surface-modified pigment ink that can be stably dispersed without using a dispersing agent (e.g. a surfactant). However, printed images obtained with this surface-modified pigment ink have significantly poor abrasion resistance and water resistance.

As another example of a dispersion system of an ink, there has been proposed an inkjet ink using a microcapsule or emulsion type dispersion liquid in which pigment particles are coated with a resin (see PTL 2 etc.). However, there is a problem in this system such that the production cost is high because of its long production procedure.

As seen above, various improvements have been made in the art. However, at the time when images are printed on paper having a high penetration speed (e.g. plain paper), penetration of ink into the inside or back side of the plain paper resulted in an image having significantly a low image density and color saturation compared to images output by offset printing, screen printing, or electrophotography.

To overcome this problem, there have been proposed a recording medium (e.g. a plain paper) a surface of which has been coated with a material for fixing a coloring material thereon, and a recording medium a surface of which has been coated with a white pigment or water-soluble polymer. However, these recording media are expensive as special processing is required for the coating, and thus have not been commonly used.

To correspond to use of a common recording medium such as a plain paper, there has been proposed an inkjet recording method capable of forming an image having a high image density and color saturation on the plain paper, in which a pretreatment liquid which aggregates a coloring material is applied to a recording medium in advance, and an ink is then jetted on the area where the pretreatment liquid has been applied.

A type of a coagulating agent contained in the pretreatment liquid is selected depending on a polarity of a coloring agent, or dispersion system.

For example, in the case where a coloring agent is dispersed with assistance of an anionic surfactant or polymer dispersing agent, cationic particles or polyvalent metal salts cause strong aggregations. In this case, the speed of the aggregation reaction is fast, and thus ink droplets are fixed before they penetrate and spread on a surface of a recording medium. Therefore, a dot diameter of an ink will not increase, which efficiently suppresses bleeding between colors (color bleeding), but image density or color saturation of an image may be low. Moreover, the pigment component of the coloring agent remains only on the surface of the recording medium without penetrating into the recording medium, and thus abrasion resistance may be significantly deteriorated.

In the case where a coloring material is dispersed with assistance of a nonionic surfactant, a coagulating agent providing efficient aggregations cannot be found, and only an aggregation effect from a resin emulsion added for improving dispersion stability and fixing ability is expected. Therefore, although image density, color bleeding, and abrasion resistance are improved, sufficient effects thereof cannot be attained.

In the case where a surface-modified pigment is used as a coloring agent, polyvalent metal salts cause strong aggregations, though the effects thereof are varied depending on the type of hydrophilic groups. In this case, much like the case where the coloring material is dispersed by the anionic surfactant or polymer dispersing agent, the speed of the aggregation reaction is fast, and thus the color bleeding is suitably prevented, but color density or color saturation of an image may be low due to excessively controlled dots, providing insufficient abrasion resistance.

In the case where a resin-coated pigment is used as a coloring material, organic acids or polyvalent metal salts cause aggregations, though the effect thereof varies depending on the type of hydrophilic groups. In this case, the speed of the aggregation reaction is relatively slow, and a dot diameter of an ink is large. Therefore, the resulting image has high image density and color saturation, and provides relatively excellent abrasion resistance. However, the color bleeding cannot be efficiently prevented.

As have been mentioned above, there are advantages and disadvantages in the combination of the dispersion system and pretreatment liquid for use. Therefore, there has been proposed an inkjet recording method using an ink in which these pigment dispersion systems are mixed, and a pretreatment liquid (see PTL 3). PTL 4 and the like propose a combination of a mixed ink having dispersed particles using a surface-modified dispersed particles and polymer dispersing agent, and a pretreatment liquid. PTL 5 discloses a combination of a mixed ink having dispersed particles subjected to different surface modifications, and a pretreatment liquid containing a polyvalent metal salt. However, the speed of the aggregation reaction between the surface-modified dispersed particles or dispersed particles using the polymer dispersing agent, and the polyvalent metal salt is extremely fast, and thus image density and color saturation of an image may be low because printed dots will not spread, or abrasion resistance may be low as the pigment component of the coloring material remains on a surface of a recording medium. Therefore, these problems have not yet been solved.

As have been mentioned above, there are various types of dispersion systems of a pigment and pretreatment liquids containing a coagulating agent, and various combinations thereof have been proposed. However, it is a current situation that an ink, or a combination of an ink and pretreatment liquid that produces images satisfying excellent image density, color saturation, prevention of color bleeding, and abrasion resistance at the same time, is not available.

CITATION LIST

Patent Literature

[PTL1] Japanese Patent Application Laid-Open (JP-A) No. 2004-169008
[PTL2] JP-A No. 2002-20664
[PTL3] JP-A No. 2008-519138
[PTL4] JP-A No. 2002-079740
[PTL5] JP-A No. 2006-160815

SUMMARY OF INVENTION

Technical Problem

The present invention aims at providing an ink for inkjet recording, which is excellent in coloring ability and abrasion resistance, and is capable of producing excellent images without causing color bleeding. The present invention also aims at providing an inkjet recording method using such ink, an ink cartridge housing such ink therein, and a recorded matter produced using such ink.

Solution to Problem

The aforementioned problems can be solved by the following aspects <1> to <15> of the present invention.
<1> An ink for inkjet recording, containing:
  dispersed particles A;
  dispersed particles B;
  a surfactant; and
  water,
wherein the dispersed particles A are coloring particles obtained by dispersing an organic pigment in water with assistance of a surfactant, and the dispersed particles B are coloring particles obtained by dispersing a polymer-coated organic pigment in water.
<2> The ink for inkjet recording according to <1>, wherein the surfactant used for dispersing the coloring particles of the dispersed particles A is a compound expressed by the following general formula 1:

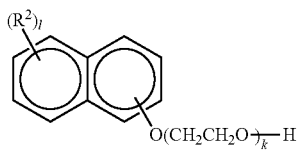

General Formula 1 where $R^2$ is a C1-20 alkyl group, a C1-20 aralkyl group, or an allyl group; $l$ is an integer of 0 to 7; and $k$ is an integer of 20 to 80.
<3> The ink for inkjet recording according to <2>, wherein the surfactant used for dispersing the coloring particles of the dispersed particles A is a compound expressed by any one of the following structural formulae 3 to 6:

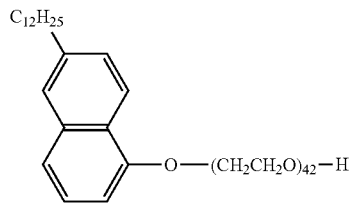

Structural Formula 3

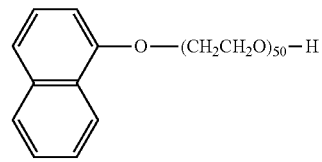

Structural Formula 4

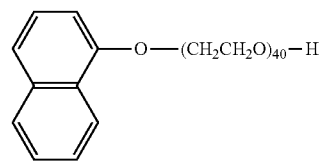

Structural Formula 5

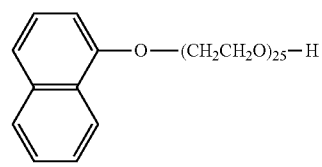

Structural Formula 6

<4> The ink for inkjet recording according to <1>, wherein the surfactant used for dispersing the coloring particles of the dispersed particles A is a compound expressed by the following structural formula 2:

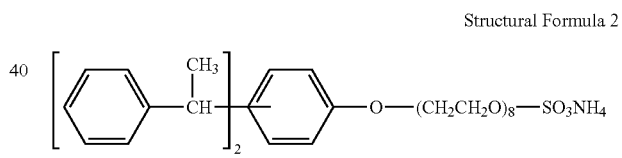

Structural Formula 2

<5> The ink for inkjet recording according to any one of <1> to <4>, wherein the polymer used in the polymer-coated particles of the dispersed particles B is a vinyl polymer or a polyester polymer.
<6> The ink for inkjet recording according to any one of <1> to <5>, further comprising a polyurethane resin emulsion containing no organic pigment.
<7> The ink for inkjet recording according any one of <1> to <6>, further containing a water-soluble solvent.
<8> The ink for inkjet recording according to <7>, wherein the water-soluble solvent contains at least one selected from the group consisting of 1,3-butanediol, and 3-methyl-1,3-butanediol.
<9> The ink for inkjet recording according to any one of <1> to <8>, further containing C8-11 polyol.
<10> The ink for inkjet recording according to <9>, wherein the C8-11 polyol contains at least one selected from the group consisting of 2-ethyl-1,3-hexanediol, and 2,2,4-trimethyl-1,3-pentanediol.
<11> An inkjet recording method, containing:
  jetting the ink as defined in any one of <1> to <10> to a recording medium.

<12> The inkjet recording method according to <11>, further comprising: applying a pretreatment liquid to the recording medium before the jetting, wherein the pretreatment liquid contains at least water, and a coagulating agent formed of an acid, or a polyvalent metal salt, and wherein the coagulating agent is lactic acid, malic acid, tartaric acid, citric acid, or magnesium sulfate.

<13> The inkjet recording method according to any of <11> or <12>, wherein for the applying and the jetting, an inkjet recording device containing an ink-jetting unit is used, and the ink-jetting unit is configured to apply a stimulus to the ink so as to jet the ink to form an image.

<14> An ink cartridge for inkjet recording, containing:

a cartridge case; and the ink as defined in any one of <1> to <10>, housed in the cartridge case.

<15> A recorded matter, containing:

a recording medium; and an image formed on the recording medium with the ink as defined in any one of <1> to <10>.

Advantageous Effects of Invention

The present invention can provide an ink for inkjet recording, which is excellent in coloring ability and abrasion resistance, and is capable of producing excellent images without causing color bleeding, an inkjet recording method using such ink, an ink cartridge housing such ink therein, and a recorded matter produced using such ink.

DESCRIPTION OF EMBODIMENTS

Figure 1:
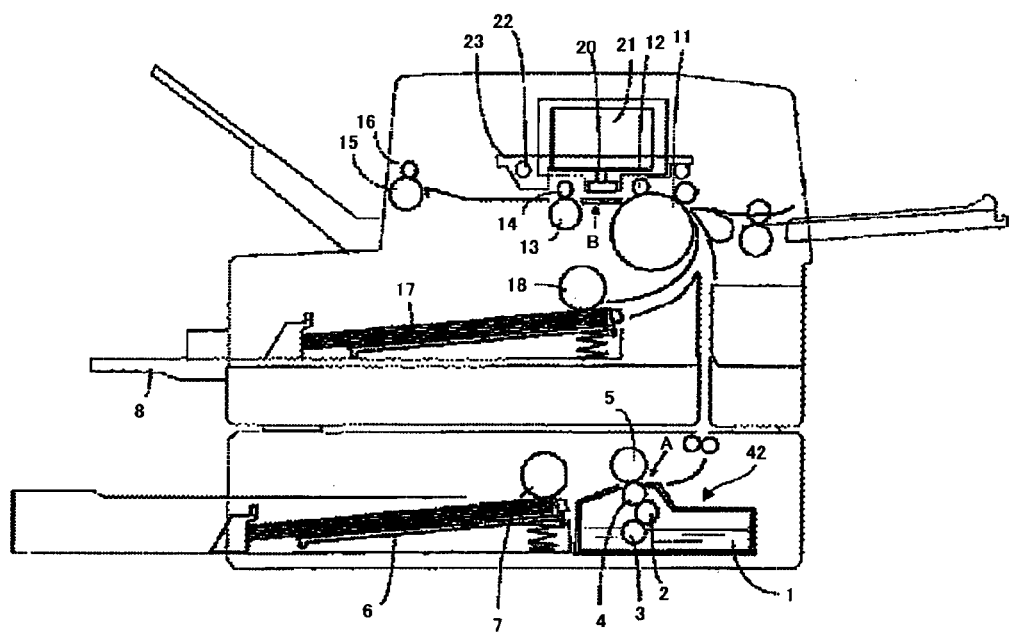
FIG. 1 is a cross-sectional view showing an example of an inkjet recording device equipped with a pretreatment liquid applying system.

The present invention will be specifically explained hereinafter.

The ink for inkjet recording (may be referred to as "ink" hereinafter) of the present invention contains at least dispersed particles A, dispersed particles B, a surfactant, and water, and may further contain a polyurethane resin emulsion, a water-soluble solvent (e.g. a water-soluble organic solvent (a wetting agent)), C8-11 polyol, and other substances, if necessary. The dispersed particles A are obtained by dispersing an organic pigment in water with assistance of a surfactant, and the dispersed particles B are obtained by dispersing a polymer-coated organic pigment in water.

By jetting the ink of the present invention to the recording medium, excellent images having excellent coloring ability and abrasion resistance can be attained without causing color bleeding.

The materials for forming the ink of the present invention will each be explained below.

<Organic Pigment>

Examples of the organic pigment include azo pigments, phthalocyanine pigments, anthraquinone pigments, dioxazine pigments, indigo pigments, thioindigo pigments, perylene pigment, isoindolenone pigments, aniline black, azomethine pigments, and rhodamine B lake pigments.

The organic pigment may be any of the yellow pigment, magenta pigment, cyan pigment, intermediate color pigment, and color pigment listed below.

Specific examples of the yellow pigment include C.I. Pigment Yellow 1 (Fast Yellow G), 2, 3, 12 (Disazo Yellow AAA), 13, 14, 16, 17, 20, 23, 24, 34, 35, 37, 42 (Yellow Iron Oxide), 53, 55, 73, 74, 75, 81, 83 (Disazo Yellow HR), 86, 93, 95, 97, 98, 100, 101, 104, 108, 109, 110, 114, 117, 120, 125, 128, 129, 137, 138, 139, 147, 148, 150, 151, 153, 154, 155, 166, 168, 180, and 185.

Specific examples of the magenta pigment include: C.I. Pigment Violet 19; and C.I. Pigment Red 1, 2, 3, 5, 7, 9, 12, 17, 22 (Brilliant Fast Scarlet), 23, 31, 38, 48:1 [Permanent Red 2B (Ba)], 48:2 [Permanent Red 2B (Ca)], 48:3 [Permanent Red 2B (Sr)], 48:4 [Permanent Red 2B (Mn)], 49:1, 52:2, 53:1, 57:1 (Brilliant Carmine 6B), 60:1, 63:1, 63:2, 64:1, 81 (Rhodamine 6G Lake), 83, 88, 92, 97, 104, 105, 106, 108 (cadmium red), 112, 114, 122 (dimethyl quinacridon), 123, 146, 149, 166, 168, 170, 172, 175, 176, 178, 179, 180, 184, 185, 190, 192, 193, 202, 209, 215, 216, 217, 219, 220, 223, 226, 227, 228, 238, 240, 254, 255, and 272.

Specific examples of the cyan pigment include: C.I. Pigment Blue 1, 2, 3, 15 (Cupper Phthalocyanine Blue R), 15:1, 15:2, 15:3 (Phthalocyanine Blue G), 15:4, 15:6 (Phthalocyanine Blue E), 16, 17:1, 22, 56, 60, 63, and 64; and Violet Blue 4, and Violet Blue 60.

Specific examples of the intermediate color pigment for red, green and blue include: C.I. Pigment Red 177, 194, 208, 224, 254, and 264; C.I. Pigment Orange 16, 36, 43, 51, 55, 59, 61, and 71; C.I. Pigment Violet 3, 19, 23, 29, 30, 37, 40, and 50; and C.I. Pigment Green 7, and 36.

As the color pigment for use in the present invention, C.I. Pigment Yellow 74, 138, 150, 155, and 185, C.I. Pigment Red 122, 202, 208, and 209, C.I. Pigment Violet 19, and 23, C.I. Pigment Blue 15:3, 15:4, and 60, and C.I. Pigment Green 7, and 36 are particularly preferable because of their dispersibility and coloring ability.

The organic pigment is not restricted in terms of the average particle diameter thereof, but preferably has an average particle diameter of 20 nm to 200 nm, more preferably 30 nm to 150 nm, and even more preferably 50 nm to 100 nm. When the average particle diameter of the pigment is 20 nm or more, lightfastness and storage stability are sufficiently secured without deteriorating these properties. Moreover, when the average particle diameter thereof is 200 nm or less, such cases can be avoided that printed images have low saturation, viscosity of the ink increases and/or aggregations of particles occur in the ink during storage, and a nozzle is blocked during printing. Note that, the aforementioned average particle diameter means a 50% average particle diameter (D50) measured at 23° C. using Microtrack UPA-150 (manufactured by Nikkiso Co., Ltd.), a sample which is diluted with water to have a pigment concentration of 0.01% by mass, and as parameters, taking a particle refractive index of 1.51, pigment density 1.4 g/cm$^3$, and pure water (as a solvent parameter).

The organic pigment concentration of the ink is preferably 2% by mass to 15% by mass, more preferably 3% by mass to 12% by mass, even more preferably 4% by mass to 10% by mass. When the organic pigment concentration is 2% by mass or more, sufficient coloring ability can be attained, and there is no problem in brightness of the images. When the organic pigment concentration is 15% by mass or less, there is no problem in storage stability of the ink, or in quality of images in terms of brightness.

<Surfactant (Dispersing Agent)>

To obtain the dispersed particles A, a surfactant is used for dispersing the pigment in water. The surfactant is generally classified into a nonionic surfactant, anionic surfactant, and amphoteric surfactant, and is suitably selected depending on the pigment to be used, or the formulation of the ink.

Examples of the nonionic surfactant include: polyoxyethylene alkyl ether such as polyoxyethylene lauryl ether, polyoxyethylene myristyl ether, polyoxyethylene cetyl ether, polyoxyethylene stearyl ether, and polyoxyethylene oleyl ether; polyoxyethylene alkylphenyl ether such as polyoxyethylene octylphenyl ether, and polyoxyethylene nonylphenyl ether; polyoxyethylene-α-naphthyl ether, polyoxyethylene-β-naphthyl ether, polyoxyethylene monostyryl ether, polyoxyethylene distyryl ether, polyoxyethylene alkylnaphthyl ether, polyoxyethylene monostyrylnaphthyl ether, and polyoxyethylene distyrylnaphthyl ether. Among them, the nonionic surfactant expressed by the general formula 1 is preferable as it can improve the dispersion stability of the dispersed particles A. Although the compounds where l is 0 and k is 50, where $R^2$ is $C_{12}H_{25}$, l is 1, and k is 42, where l is 0 and k is 40, and where l is 0 and k is 25 are used in Examples as the nonionic surfactant expressed by the general formula 1, any compound expressed by the general formula 1 can be used provided that $R^2$ is any of a C1-20 alkyl group, a C1-20 aralkyl group, or an allyl group, l is an integer of 0 to 7, and k is in an approximate range of 20 to 80. Moreover, the aforementioned surfactants in which part of polyoxyethylene is replaced with polyoxypropylene (e.g. polyoxyethylene-polyoxypropylene block copolymers), and condensates in which compounds having aromatic rings (e.g. polyoxyethylene alkylphenyl ether) are condensed with formalin can be also used.

The nonionic surfactant preferably has a hydrophilic-lipophilic balance (HLB) value of 12 to 19.5, more preferably 13 to 19. When the HLB value thereof is 12 or more, there is no problem in compatibility of the surfactant to a dispersion medium and thus dispersion stability may not be deteriorated. When the HLB value is 19.5 or less, the surfactant easily adsorb the pigment and thus dispersion stability may not be deteriorated.

Examples of the anionic surfactant include polyoxyethylene alkyl ether sulfate, polyoxyethylene alkylphenyl ether sulfate, polyoxyethylene monostyrylphenyl ether sulfate, polyoxyethylene distyrylphenyl ether sulfate, polyoxyethylene alkyl ether phosphate, polyoxyethylene alkylphenyl ether phosphate, polyoxyethylene monostyrylphenyl ether phosphate, polyoxyethylene distyrylphenyl ether phosphate, polyoxyethylene alkyl ether carboxylate, polyoxyethylene alkylphenyl ether carboxylate, polyoxyethylene monostyrylphenyl ether carboxylate, polyoxyethylene distyrylphenyl ether carboxylate, naphthalene sulfonate-formalin condensate, melanin sulfonate-formalin condensate, dialkylsulfosuccinate, sulfosuccinic acid alkyl dichloride, polyoxyethylene alkylsulfosuccinic acid dichloride, alkyl sulfoacetate, α-olefin sulfonate, alkylbenzene sulfonate, alkylnaphthalene sulfonate, alkyl sulfonate, N-acyl amino acid salt, acylated peptide, and soap.

To enhance storage stability of the dispersed particles A, the dispersing agent for use is preferably a nonionic dispersing agent expressed by the structural formula 1. Although in Examples the compound expressed by the structural formula 1 where l=0 and k=50, and the compound expressed by the structural formula 1 where $R^2$=$C_{12}H_{25}$, l=1, k=42 are used, any dispersing agent expressed by the structural formula 1 can be used, provided that $R^2$ is a C1-20 alkyl group, C1-20 aralkyl group, or allyl group, l is an integer of 0 to 7, and k is an integer of about 20 to about 80.

The amount of the surfactant-based dispersing agent to be added is preferably about 10% by mass to about 50% by mass relative to the amount of the pigment. When the amount of the dispersing agent is 10% by mass or more, there is no problem in the storage stability of the pigment dispersion and ink, or in the time required to disperse the pigment. When the amount thereof is 50% by mass or less, the viscosity of the ink may not significantly increase and thus there is no problem in the jetting stability of the ink.

<Polymer-Coated Pigment Particles>

To obtain the dispersed particles B, organic pigment particles are subjected to microcapsulation or emulsification to coat them with hydrophilic polymer for dispersing such pigment particles in an aqueous medium. Methods for the microcapsulation or emulsification can be selected from those known in the art. Such methods include chemical methods, physical methods, physical-chemical methods, and mechanical methods. Specific examples thereof include an acid precipitation, phase reversal emulsification, interfacial polymerization, in-situ polymerization, in-situ film curing (in liquid), coacervation (phase separation), in-situ drying (in liquid), melting dispersion cooling, in-situ suspension film forming (in gas), and spray drying. The methods used especially for inkjet are the acid precipitation, phase reversal emulsification and interfacial polymerization.

The polymer particles each containing the organic pigment particles therein exhibit excellent dispersibility in water by introducing ionic groups on surfaces of the polymer particles. Examples of such ionic group include a sulfonic acid group, a carboxylic acid group, a sulfuric acid group, a phosphoric acid group, a phosphonic acid group, and a phosphinic acid; and an alkali metal salt group thereof, an ammonium salt group thereof, and a primary to tertiary amine group thereof. Among them, a carboxylic acid alkali metal salt group, carboxylic acid ammonium salt group, sulfonic acid alkali metal salt group, and sulfonic acid ammonium salt group are preferable, and the sulfonic alkali metal salt group and sulfonic acid ammonium salt group are particularly preferable in terms of the dispersion stability in water. The ionic group is introduced by adding monomers each having an ionic group(s) during a synthesis of a resin. Examples of the salts mentioned above include an ammonium ion, Li, Na, K, Mg, Ca, Cu, and Fe. Among them, Li, K, and Na are preferable.

In the dispersion liquid in which the dispersed particles B are dispersed, all of the organic pigment particles are not necessarily coated with a polymer. The organic pigment particles may partially be adsorbed on polymer particles, or may be directly dispersed in a dispersion medium, provided that dispersion stability is not adversely affected thereby. The state of the dispersion is preferably a polymer emulsion.

Examples of polymers for forming a polymer emulsion include vinyl polymer, polyester polymer, polyurethane polymer, and polymers disclosed in JP-A Nos. 2000-53897 and 2001-139849. Among them, vinyl polymer and polyester polymer are particularly preferable.

<Vinyl Polymer>

The vinyl polymer is suitably selected from resins formed by polymerizing one or more polymerizable monomers listed below, without any restriction. Examples of the polymerizable monomers include: vinyl-based aromatic hydrocarbon such as styrene, o-methyl styrene, m-methyl styrene, p-methyl styrene, α-methyl styrene, p-ethyl styrene, 2,4-dimethyl styrene, p-tert-butyl styrene, p-chlorostyrene, and divinyl benzene; (meth)acrylic ester such as methyl acrylate, ethyl acrylate, butyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl) butyl acrylate, 2-ethylhexyl acrylate, cyclohexyl acrylate, hexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, t-butyl methacrylate, n-pentyl methacrylate, isopentyl methacrylate, neopentyl methacrylate, 3-(methyl)butyl methacrylate, 2-ethylhexyl methacrylate, hexyl methacrylate, octyl methacrylate, nonyl methacrylate, decyl methacrylate, undecyl methacrylate, and dodecyl methacrylate; unsaturated carboxylic acid such as acrylic acid, methacrylic acid, itaconic acid, and maleic acid; and (meth)acryl amide, N-substituted makeimide, maleic anhydride, (meth)acrylonitrile, vinyl ketone, vinyl acetate, and vinylidene chloride.

<Polyester Polymer>

Polyester polymer is formed of polyvalent carboxylic acids, and polyhydric alcohols.

Examples of the polyvalent carboxylic acid include: aromatic dicarboxylic acid such as terephthalic acid, isophthalic acid, orthophthalic acid, 1,5-naphthalene carboxylic acid, 2,6-naphthalene carboxylic acid, diphenic acid, sulfoterephthalic acid, 5-sulfoisophthalic acid, hexahydrophthalic anhydride, 4-sulfophthalic acid, 4-sulfonaphthalene-2,7-dicarboxylic acid, 5-[4-sulfophenoxy]isophthalic acid; aliphatic dicarboxylic acid such as succinic acid, adipic acid, azelaic acid, sebacic acid, and dodecane dicarboxylic acid; and others such as aromatic oxycarboxylic acid, alicyclic dicarboxylic acid, and polyvalent carboxylic acid having tri- or higher valency.

Examples of the polyhydric alcohol include: aliphatic polyhydric alcohol such as ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol, trimethylol ethane, trimethylol propane, glycerin, pentane erythritol, 1,4-cyclohexanediol, 1,4-cyclohexanedimethanol, spiroglycol, tricyclodecanediol, tricyclodecane methanol, methaxylene glycol, orthoxylene glycol, 1,4-phenylene glycol, bisphenol A, and lactone-based polyester polyol; and others such as alicyclic polyhydric alcohols, and aromatic polyhydric alcohols.

<Polyurethane Resin Emulsion>

The polyurethane resin emulsion is added for enhancing dispersion stability of the dispersed particles A, and fixing ability (abrasion resistance) of prints.

The polyurethane resin is formed by polymerizing polyisocyanate with polyether polyol, polyester polyol, polylactone polyol, polycarbonate polyol, and/or the like.

Examples of polyisocyanate include: aliphatic diisocyanate compounds such as hexamethylene diisocyanate, and 2,2,4-trimethylhexamethylene diisocyanate; alicyclic diisocyanate compounds such as isophorone diisocyanate, hydrogenated xylene diisocyanate, 1,4-cyclohexane diisocyanate, and 4,4'-dicyclohexylmethane diisocyanate; aromatic aliphatic isocyanate compounds such as xylylene diisocyanate, and tetramethylxylene diisocyanate; aromatic diisocyanate compounds such as toluoylene diisocyanate, and phenylmethane diisocyanate; and modified compounds of these diisocyanate compounds (e.g. modified compounds including carbon diimide, uretodione, or uretoimine).

Examples of polyether polyol include polyethylene glycol, polypropylene glycol, polytetramethylene ether glycol, and polyhexamethylene ether glycol.

Examples of polyester polyol include polyethylene adipate, polybutylene adipate, polyneopentyl adipate, poly-3-methylpentyl adipate, polyethylene/butylene adipate, and polyneopentyl/hexyl adipate.

Examples of polylactone polyol include polycaprolactonediol, and polyomega-hydroxycaproic acid polyol.

Examples of polycarbonate polyol include those known in the art, such as reaction products of diol (e.g. 1,3-propanediol, 1,4-butanediol, 1,6-hexanediol, diethylene glycol, triethylene glycol and tetraethylene glycol), phosgene, and diaryl carbonate (e.g. diphenyl carbonate) or cyclic carbonate (e.g. ethylene carbonate and propylene carbonate).

Polyester carbonate formed by reacting the aforementioned polyester or polylactone, phosgene, and diaryl carbonate or cyclic carbonate can be also suitably used.

The aforementioned polyurethane resin emulsion exhibits further enhanced water dispersibility by introducing an ionic group(s) to the resin. Examples of such ionic group include a sulfonic acid group, a carboxylic acid group, a sulfuric acid group, a phosphoric acid group, a phosphonic acid group, and an alkali metal salt group of these groups, an alkaline earth metal salt group of these groups, an ammonium salt group thereof, and a primary to tertiary amine group. Among them, a carboxylic acid alkali metal salt group, carboxylic acid ammonium salt group, sulfonic acid alkali metal salt group, and sulfonic ammonium salt group are preferable, and the sulfonic acid alkali metal salt group and sulfonic acid ammonium salt group are particularly preferable in view of dispersion stability in water. Introduction of the ionic group is carried out by adding a monomer having an ionic group(s) during a synthesis of the resin. As for the salt mentioned above, a salt of Li, K, or Na is preferable.

<Penetrating Agent>

By adding the penetrating agent to the ink, the surface tension of the ink is decreased, to thereby increase the speed of penetration of the ink into a recording medium after ink droplets are deposited on the recording medium such as paper. Therefore, occurrences of feathering and color bleeding are reduced. A surfactant is mainly used as the penetrating agent, and is classified into a nonionic surfactant, an anionic surfactant, and an amphoteric surfactant depending on polarity of an hydrophilic group contained therein. In addition, the surfactant is classified into a fluorosurfactant, a silicon surfactant, and an acetylene surfactant depending on a structure of a hydrophobic group contained therein.

The appropriate surface tension of the ink of the present invention is in the range of 20 mN/m to 35mN/m.

Examples of the nonionic surfactant include polyol, glycol ether, polyoxyethylene alkyl ether, polyoxyethylene polyoxypropylene alkyl ether, polyoxyethylene alkyl ester, polyoxyethylene sorbitan fatty acid ester, polyoxyethylene alkylphenyl ether, polyoxyethylene alkyl amine, polyoxyethylene alkyl amide, and acetylene glycol.

Examples of the anionic surfactant include polyoxyethylene alkyl ether acetate, dodecyl benzene sulfonate, a salt of lauryl alcohol sulfuric acid ester such as sodium lauryl sulfate, and a salt of polyoxyethylene alkyl ether sulfate.

Examples of the fluorosurfactant include perfluoroalkyl sulfonate, perfluoroalkyl carboxylate, perfluoroalkyl phosphoric acid ester, perfluoroalkylethylene oxide adducts, perfluoroalkyl betaine, perfluoroalkyl amine oxide compounds. Examples of the commercially available fluorosurfactant include SURFLON S-386 (manufactured by AGC SEIMI CHEMICAL CO., LTD.), FC-4430 (manufactured by Sumitomo 3M Limited), MEGAFACE F-470 (manufactured by DIC Corporation), ZONYL FS-300 (manufactured by Du Pont Kabushiki Kaisha), and these products can be easily obtainable and used for the present invention.

Examples of the silicone surfactant include a polyether-modified silicone compound. The polyether-modified silicone compound is classified into a side chain type (pendant type) in which polyether groups are introduced at side chains of polysiloxane, a side terminal type in which a polyether group is introduced at one terminal of polysiloxane, a both terminal type (ABA type) in which polyether groups are respectively introduced at both terminals of polysiloxane, a side-chain and both-terminal type in which polyether groups are introduced at side chains and both terminals of polysiloxane, an ABn type in which (A) polysiloxane to which a polyether group(s) is (are) introduced and (B) polysiloxane to which no polyether group is introduced are bonded in turn, and a branch type in which a polyether group(s) is (are) introduced at a terminal(s) of branched polysiloxane. The polyether-modified silicone compound for use in the present invention is preferably the side chain type (pendant type) having a structure such that polyether groups are introduced at side chains of polysiloxane.

Examples of the commercially available product thereof include KF-353 (manufactured by Shin-Etsu Chemical Co., Ltd.), L-7604 (manufactured by Dow Corning Toray Co., Ltd.), and BYK-348 (BKY Japan KK).

Examples of the acetylene glycol surfactant include acetylene glycol such as 2,4,7,9-tetramethyl-5-decyne-4,7-diol, 3,6-dimethyl-4-octyne-3,6-diol, 3,5-dimethyl-1-hexyn-3-ol. For example, SURFYNOL 104, 82, 465, 485, and TG (manufactured by Air Products and Chemicals, Inc.) can be used.

In the case where the surfactant is added to the ink as a penetrating agent, the amount of the surfactant to be added is preferably 0.05% by mass to 5% by mass, more preferably 0.1% by mass to 3% by mass.

Two or more surfactants may be used in combination for the ink of the present invention. Moreover, C8-11 polyol such as 2-ethyl-1,3-hexanediol, and 2,2,4-trimethyl-1,3-pentanediol may be added in combination with the surfactant to increase penetration performance of the ink.

<Water-Soluble Solvent (Water-Soluble Organic Solvent (Wetting Agent))>

The ink of the present invention uses water as a fluid medium, but preferably further contain a water-soluble organic solvent for preventing the ink from being dried (used as a wetting agent), and enhancing dispersion stability. Examples of the water-soluble solvent (water-soluble organic solvent (wetting agent)) are listed below, and two or more water-soluble solvents (water-soluble organic solvents (wetting agents)) listed below may be mixed together and then used.

Polyhydric alcohols, such as ethylene glycol, diethylene glycol, triethylene glycol, tetraethylene glycol, polyethylene glycol, propylene glycol, dipropylene glycol, tripropylene glycol, polypropylene glycol, hexylane glycol, 1,3-butanediol, 3-methyl-1,3-butanediol, 1,5-pentanediol, 1,6-hexanediol, glycerin, trimethylol ethane, trimethylol propane, 1,2,3-butanetriol, 1,2,4-butanetriol, 1,2,6-hexanetriol, and 3-methyl-1,3,5-pentanetriol.

Polyhydric alcohol alkyl ethers, such as ethylene glycol monoethyl ether, ethylene glycol monobutyl ether, diethylene glycolmonomethyl ether, diethylene glycolmonoethyl ether, diethylene glycol monobutyl ether, tetraethylene glycolmonomethyl ether, and propylene glycolmonoethyl ether.

Polyhydric alcohol aryl ethers, such as ethylene glycol monophenyl ether, and ethylene glycol monobenzyl ether.

Nitrogen-containing heterocyclic compounds, such as 2-pyrrolidone, N-methyl-2-pyrrolidone, N-hydroxyethyl-2-pyrrolidone, 1,3-dimethylimidazolidinone, ε-caprolactum, and γ-butyrolactone.

Amides, such as formamide, N-methyl formamide, and N,N-dimethyl formamide.

Amines, such as monoethanol amine, diethanol amine, triethanol amine, monoethyl amine, diethyl amine, and triethyl amine.

Sulfur-containing compounds, such as dimethyl sulfoxide, sulfolane, and thiodiethanol.

Propylene carbonate

Ethylene carbonate

In addition to the aforementioned water-soluble solvent (water-soluble organic solvent (wetting agent)), other wetting agents may be added. Such wetting agent preferably contains sugar. Examples of the sugar include monosaccharide, disaccharide, oligosaccharide (including trisaccharide and tetrasaccharide), and polysaccharide, and specifically, preferable examples thereof include glucose, mannose, fructose, ribose, xylose, arabinose, galactose, maltose, cellobiose, lactose, sucrose, trahalose, and maltotriose. Here, "polysaccharide" means sugar in a broad sense, and include compounds widely present in the nature, such as α-cyclodextrin, and cellulose.

Moreover, examples of derivatives of these sugars include reducing sugars (e.g. sugar alcohol [$HOCH_2(CHOH)_n CH_2OH$ (n=2 to 5)]), sugar acids (eg. aldonic acid, and uronic acid), amino acids, and thio acids. Among them, sugar alcohol is particularly preferable, and specific examples thereof include D-sorbitol, sorbitan, maltitol, erythritol, lactitol, and xylitol.

Particularly when glycerin, 1,3-butanediol, and/or 3-methyl-1,3-butanediol is used in the ink of the present invention, an ink having excellent storage stability and jetting stability can be attained.

A ratio of the pigment to the wetting agent largely affects jetting stability of the ink jetted from an ink head. When the solid content of the pigment is high whereas the formulated amount of the wetting agent is low, evaporation of water adjacent to an meniscus of a nozzle is accelerated, causing jetting failures.

Therefore, the formulated amount of the wetting agent is set in the approximate range of 10% by mass to 50% by mass. The ratio X/Y of the total amount X of the wetting agent contained in the ink to the total amount Y of the organic pigment and resin emulsion is preferably 0.5 to 12.5, more preferably 1.0 to 6.0, even more preferably 2.0 to 5.0. The ink having such ratio in this range exhibits excellent drying properties, and shows excellent results in a storage test or reliability test.

A resin emulsion may be added to the ink of the present invention mainly when an improvement in abrasion resistance of resulted images is desired, and a pigment is used for the coloring agent. An emulsion of an acrylic resin, styrene-acryl resin, acryl silicone resin, or fluororesin is preferably used for enhancing the abrasion resistance of images, and an emulsion of polyurethane resin is particularly preferably used for enhancing storage stability. Since there are not so many resins capable of enhancing the abrasion resistance and storage stability at the same time, resin emulsions may be used in combination. These resin emulsions are suitably selected from commercially available products.

<C8-11 Polyol>

The C8-11 polyol is suitably selected depending on the intended purpose without any restriction. Examples thereof include 2,2,4-trimethyl-1,3-pentanediol, and 2-ethyl-1,3-hexanediol.

The ink of the present invention may further contain additives known in the art, such as a pH regulator, preservative and fungicide, anti-rust agent, chelating agent, UV absorbent, and antioxidant.

The pH regulator is added to the ink for adjusting the ink to alkaline so that the dispersing state and jetting performance of the ink are stabilized. When the pH value of the ink is 11 or more, such ink decomposes inkjet heads or ink supplying units to a great degree, causing problems such as deterioration of the ink, leak, jetting failures, and the like. In the case where the organic pigment is used in the ink, the pH regulator is added preferably during mixing and dispersing the organic pigment and the surfactant (i.e. the dispersing agent) in water, rather than added together with the wetting agent and penetrating agent after the mixing and dispersing. This is because the dispersing state may be destroyed by the pH regulator.

The pH regulator contains at least one selected from the group consisting of alcohol amine, alkali metal hydroxide, ammonium hydroxide, phosphonium hydroxide, and alkali metal carbonate.

Examples of alcohol amine include diethanol amine, triethanol amine, and 2-amino-2-ethyl-1,3-propanediol. Examples of alkali metal hydroxide include lithium hydroxide, sodium hydroxide, and potassium hydroxide. Examples of ammonium hydroxide include ammonium hydroxide, and quaternary ammonium hydroxide. Examples of phosphonium hydroxide include quaternary phosphonium hydroxide. Examples of alkali metal carbonate include lithium carbonate, sodium carbonate, and potassium carbonate.

Examples the preservative and fungicide include sodium dehydroacetate, sodium sorbate, sodium-2-pyrridinethiol-1-oxide, sodium benzoate, and sodium pentachlorophenol.

Examples of the anti-rust agent include acid sulfite, sodium thiosulfate, ammonium thioglycolate, diisopropyl ammonium nitrite, pentaerythritol tetranitrate, and dicyclohexyl ammonium nitrite.

Examples of the chelating agent include sodium ethylenediamine tetraacetate, sodium nitrilotriacetate, sodium hydroxyethyl ethylenediamine triacetate, sodium diethylenetriamine pentaacetate, and sodium uramil diacetate.

(Inkjet Recording Method)

An inkjet recording method of the present invention contains at least a jetting step, and may further contain a pretreatment-liquid applying step and other steps, if necessary.

<Jetting Step>

The jetting step is jetting the ink for inkjet recording of the present invention to a recording medium.

<Pretreatment-Liquid Applying Step>

The pretreatment-liquid applying step is applying a pretreatment liquid to the recording medium before the jetting step.

<Pretreatment Liquid>

The pretreatment liquid is suitably selected depending on the intended purpose without any restriction, provided that it contains at least water and a coagulating agent formed of an organic acid or a polyvalent metal salt.

In inkjet recording, an image is generally formed by an inkjet method after applying a colorless or slightly tinted pretreatment liquid to a recording medium. Here, the pretreatment liquid contains an ink-fixing assistant capable of reducing dispersibility and/or solubility of the ink, and may be applied to the recording medium by jetting the pretreatment liquid in accordance with an inkjet method, or by coating the recording medium with the pretreatment liquid using a roller.

In most cases, commonly used aqueous inks contain anionic compounds or negatively charged particles. Therefore, a cationic compound or acid is preferably contained in the pretreatment liquid as a coagulating agent that reduces dispersibility and/or solubility of the ink by reacting with negatively charged particles such as an anionic compound (e.g. an anionic dye, anionic pigment, anionic polymer compound, and anionic emulsion) contained in the ink.

As the coagulating agent, organic acid, polyvalent metal salt, cationic polymer, and cationic particles (emulsion) are generally known. When the organic acid or polyvalent metal salt is used in the pretreatment liquid, a significant effect is exhibited in the improvement of the image quality, compared to the case where other ink-fixing auxiliaries are used.

The amount of the coagulating agent contained in the pretreatment liquid is preferably 10% by mass to 80% by mass, more preferably 20% by mass to 60% by mass. When the amount thereof is 10% by mass or more, cocklings may occur even if a large amount of the pretreatment liquid is deposited on a recording medium. When the amount thereof is 80% by mass or less, precipitation may not occur, and thus the pretreatment liquid can be uniformly applied to a recording medium.

<Organic Acid>

The organic acid is preferably an acidic compound, and examples thereof include lactic acid, citric acid, malic acid, succinic acid, tartaric acid, phthalic acid, glycine, glutamic acid, pyrrolidone carboxylic acid, pyrone carboxylic acid, pyrrol carboxylic acid, furan carboxylic acid, pyridinecarboxylic acid, coumaric acid, thiophenecarboxylic acid, nicotinic acid, derivatives thereof, and salts thereof.

<Polyvalent Metal Salt>

Examples of the polyvalent metal salt include aluminum chloride, calcium chloride, aluminum nitrate, magnesium nitrate, magnesium chloride, calcium nitrate, magnesium hydroxide, aluminum sulfate, and ammonium alum. Specific examples thereof include magnesium nitrate hexahydrate, magnesium acetate tetrahydrate, calcium nitrate tetrahydrate, calcium acetate monohydrate, calcium chloride anhydrate, calcium lactate pentahydrate, calcium formate anhydrate, magnesium benzoate trihydrate, and magnesium sulfate heptahydrate.

<Cationic Polymer>

Commercial products can be used as the cationic polymer. Examples of such commercial products include: SANSTAT E-818, SANFIX 70, SANFIX 555C, SANFIX LC-55, SANFIX PAC-700 Conc., SANYO ELION A-3, SANFIX 414, SANFIX 555, SANFIX PRO-100, SANFIX 555US, and CELLOPOL YM-500 (all manufactured by Sanyo Chemical Industries, Ltd.); #675, #FR-2P, and #1001 (all manufactured by Sumitomo Chemical Co., Ltd.); and LUPASOL SC61B (manufactured by BASF Japan Ltd.). In addition to the above, the following can be also listed as examples: ZP-700 (vinyl formaide), MP-184 (polyacrylate), MP-173H (polymethacrylate), MP-180 (polymethacrylate), MX-0210 (polymethacrylate), MX-8130 (polymethacrylate), E-395 (polyacrylate), E-305 (polyacrylate), Q-105H (dicyandiamide), Neo-600 (polyacryl amide), Q-101 (polyamine), Q-311 (polyamine), and Q-501 (polyamine) (all manufactured by HYMO Co., Ltd.); SUPERFLOC 2490 (polyacrylate), SUPERFLOC 3180, 3380, 3580, 3880, 3390, 3590, 3500, and SD2081 (polyacryl amide), ACCOFLOC C498T, and C498Y (oolyacrylate), SUPERFLOC 1500, 1600, ACCOFLOC C481, C483, C485, C488, and C480 (polymethacrylate), and ACCOFLOC C567, C573, C577, and C581 (polyamine) (all manufactured by MT AquaPolymer, Inc.); PAS-A-1, PAS-A-5, PAS-A-120L, PAS-A-120S, PSA-J-81, PAS-880, and PAS-92 (diallyldimethyl ammonium salt copolymer), PAS-H-5L, PAS-H-10L, and PAS-M-1 (diallyldimethyl ammonium salt polymer), PAA-HCl-3L, and PAA-HCl-10L (polyacrylamine hydrochloride), and PAA-10C (polyacrylamine) (all manufactured by Nitto Boseki Co., Ltd.); and POLYMARON 360, SIZEPINE K-921, and SIZEPINE K-925 (all manufactured by ARAKAWA CHEMICAL INDUSTRIES, LTD.).

Other than the above, examples of the cationic quaternary ammonium salt for use in the present invention include IONET D46, IONET LEC, SECRIL VN, SANSTAT 1200, SANSTAT KT-305C, CATION G-50, and IONET RK-15 (all manufactured by Sanyo Chemical Industries, Ltd.).

<Cationic Particles>

Examples of a liquid in which cationic particles are dispersed or suspended include a cationic resin emulsion, and white or slightly tinted cationic dispersion liquid.

Examples of the commercially available cationic emulsion include cationic styrene-acryl emulsions such as ACRIT UW319-SX, ACRIT RKW-460, ACRIT RKW-400SX, ACRIT RKW-450SX, AND ACRIT RKW-450 (all manufactured by Taisei Kako Co., Ltd.).

Examples of the white or slightly tinted cationic dispersion liquid include a dispersion liquid of cationic silica, preferably a silica sol that is a dispersion liquid in which spherical silica particles having a diameter of around 0.1 μm are dispersed in water. As the cationic silica, a commercial product can be used, and examples of such commercial product include SNOWTEX AK (manufactured by NISSAN CHEMICAL INDUSTRIES, LTD.), SMR8-17-109SMSG 3CS (manufactured by Grace Japan KK), and CEP10AK97002 (manufactured by Cabot Corporation).

<Additives for Pretreatment Liquid>

It is preferred that the pretreatment liquid contain 20% by mass to 80% by mass of a water-soluble solvent having a boiling point higher than that of water. This is because the amount of the pretreatment liquid applied to a recording medium varies if a solvent component such as water contained in the pretreatment liquid is evaporated, and this results in images of varied qualities. Other than use as a drying preventative, one or more water-soluble solvents (water-soluble organic solvent (wetting agent)) similar to those used for the ink of the present invention can be used for attaining desirable properties of the recording medium pretreatment liquid, enhancing the solubility stability of compounds which render the coloring agent contained in the ink insoluble, enhancing other additives, and stabilizing coating performances of the pretreatment liquid. When the amount of the water-soluble solvent is 20% by mass or more, evaporation of water from the pretreatment liquid is suppressed, reducing variation in the viscosity of the pretreatment liquid due to the evaporation of water, securing the stable application of the pretreatment liquid in terms of the amount thereof. Moreover, when the water-soluble solvent is added in this amount, problems such as the solubility of the cationic polymer becoming unstable due to evaporation of water, gelification of the pretreatment liquid, or generation of insoluble matter, may not occur.

Although water can be added to the pretreatment liquid, the amount of the water added to the pretreatment liquid is preferably small compared to the amount of water in the conventional pretreatment liquid for securing the stability in the application of the pretreatment liquid to a recording medium. Moreover, by making the proportion of water smaller than or close to the amount of water absorbed by the components of the pretreatment liquid excluding water in the equilibrium state to the atmosphere under the operating environment of a recording device, water is prevented from being evaporated at the time when the pretreatment liquid is applied to a recording medium or stored in an application device, and the similar degree of an effect for improving an image quality to the effect obtained in the case where an image recording is performed just after the application of the pretreatment liquid can be obtained even when an image is recording on a recording medium long after the pretreatment liquid is applied to a recording medium, such as about 5 minutes.

Especially by controlling the proportion of water smaller than a moisture equivalent at RH 60%, the problems such as uneven applications, or excessive applications of the pretreatment liquid due to evaporation of water from the pretreatment liquid can be prevented in any operation environment of an application device of the pretreatment liquid, even though the operation environment has changed.

The amount of water is preferably 40% by mass or less, more preferably 10% by mass to 30% by mass. When the amount of water is 40% by mass or less, problems such as the pretreatment liquid increasing in viscosity, gelification of the same, and precipitation of insoluble matters, may not occur during the application of the pretreatment liquid to a recording medium or during the standing period of an application device.

Moreover, the pretreatment liquid preferably contains monohydric alcohol. By adding monohydric alcohol, occurrences of uneven applications of the pretreatment liquid to a recording medium due to foaming of the pretreatment liquid can be prevented. Moreover, an image having a uniform image density is formed by contacting and applying the pretreatment liquid to a recording medium, and jetting an ink as droplets to the recording medium.

It is preferred that the pretreatment liquid be controlled to have a surface tension of 40 mN/m or less by adding a surfactant and/or wetting accelerator so that the wetting ability thereof to a recording medium or an application unit for applying a pretreatment liquid is increased. The pretreatment liquid is evenly deposited to a recording medium by increasing the wetting ability of the pretreatment liquid, and thus an improvement of an image quality can be possible with a small amount of the pretreatment liquid. Moreover, by increasing the wetting ability of the pretreatment liquid to an application unit such as a rubber roller or metal roller, a uniform application thereof can be easily possible.

Furthermore, the pretreatment liquid may also contain a surfactant. In the case where a pretreatment liquid containing a cationic resin and surfactant is applied to a recording medium such as a plain paper, and an ink is then deposited on the recording medium, the uneven wetness of the recording medium due to the distribution of a surface sizing agent is reduced, and thus it is possible to obtain an image having excellent reproducibility of fine lines without any feathering, high quality, and high image density with no bleeding between different colors. This is probably because the ink uniformly penetrates into the recording medium and the coloring agent is insolubilized and remains on or adjacent to the surface of the recording medium.

As the surfactant, those mentioned in the descriptions of the ink can be used, but a cationic surfactant is particularly preferably used for realizing a uniform application of the pretreatment liquid. By adding a cationic surfactant, the wetting ability of an ink and a recording medium is improved, and an image having high quality, image density and water resistance can be obtained. Examples of such cationic surfactant include IONET D46, IONET LEC, SECRIL VN, SANSTAT 1200, SANSTAT KT-305C, CATION G-50, and IONET RK-15 (all manufactured by Sanyo Chemical Industries, Ltd.). The amount of the surfactant contained in the pretreatment liquid is preferably 0.1% by mass to 50% by mass.

Moreover, other than the surfactant, a wetting accelerator may be added to the pretreatment liquid for controlling a surface tension thereof. This solvent, other than the surfactant, is suitably selected depending on the intended purpose without any restriction, and examples thereof include those mentioned in the descriptions of the ink, such as C8-11 polyols (e.g. 2-ethyl-1,3-hexanediol, and 2,2,4-trimethyl-1,3-pentanediol).

It is preferred that a binder resin be added to the pretreatment liquid for improving fixing ability.

The binder resin is suitably selected depending on the intended purpose without any restriction, and examples thereof include an acrylic resin, a vinyl acetate resin, a styrene-butadiene resin, a vinyl chloride resin, an acryl-styrene resin, a butadiene resin, and a styrene resin.

Since the pretreatment liquid is applied to a recording medium while being in contact with the recording medium, contaminating materials such as paper powder tend to be mixed therein, and these contaminants deteriorate the pretreatment liquid, resulted in a variation in the applied amount thereof, or lowering the effect for improving an image quality. Therefore, it is preferred that the pretreatment liquid contain an antiseptic-antifungal agent.

The antiseptic-antifungal agent is suitably selected depending on the intended purpose without any restriction, and those mentioned in the descriptions of the ink can be used.

Moreover, the pH value of the pretreatment liquid is preferably kept neutral. Likewise the case of the ink, a pH controlling agent can be added to the pretreatment liquid for adjusting the pH of the pretreatment liquid to a desirable value.

Other than those mentioned above, likewise the case of the ink, a UV absorbent, and antioxidant can be added to the pretreatment liquid for improving light fastness of an image.

The ink of the present invention can be suitably used for various recording devices of inkjet recording, such as inkjet recording printers, facsimile devices, and printer-facsimile-photocopier complex devices. In addition, the ink of the present invention has excellent properties such that no deposition of the ink is caused on a head of a recording device, the head having an ink repellent layer containing a fluorosilane coupling agent, or a silicone resin.

<Inkjet Recording Device>

In the inkjet recording method of the present invention, a pretreatment liquid is applied to a recording medium, and then an image is recorded with an ink including a coloring agent before the pretreatment liquid is dried and solidified. An embodiment of an inkjet recording device equipped with a pretreatment liquid applying system, which can be used in the aforementioned method, will be explained hereinafter with reference to FIG. 1.

In the device shown in FIG. 1, a recording medium 6 is sent out by a paper feeding roller 7, and a pretreatment liquid 1 stored in a container for a pretreatment liquid 42 is uniformly and thinly applied on the recording medium by an applying roller 4 and a counter roller 5. The pretreatment liquid 1 is taken out by a fountain roller 3 and uniformly supplied to the applying roller 4 by a roller for controlling a film thickness 2. The recording medium is sent to a section for record scanning where an inkjet recording head 20 is present while being coated with the pretreatment liquid. A length between a termination section for the pretreatment liquid application (Section A in FIG. 1) and an initial section for record scanning (Section B in FIG. 1) is set so as to be longer than the length of the recording medium in the traveling direction. Therefore, at the point where the recording medium reaches the initial section for record scanning, the application of the pretreatment liquid can be completely finished. In this case, as the application of the pretreatment liquid can be performed before the inkjet recording head 20 starts scanning for printing and the recording medium 6 is sent intermittently, the pretreatment liquid can be continuously applied to a recording medium at the constant transferring speed of the recording medium. Therefore, a uniform application of the pretreatment liquid is possible without any unevenness. Note that, in the embodiment of the device shown in FIG. 1, a recording medium requiring a pretreatment is supplied from a bottom cassette and a recording medium requiring no treatment is supplied from an upper cassette, and thus it is suitable for setting a path for transferring a recording medium long.

In FIG. 1, 8 denotes a paper feeding tray, 11, 12, 13, 14, 15, and 16 each denote a paper sending roller, 17 denotes paper (a recording medium), 18 denotes a paper feeding roller, 20 denotes a recording head, 21 denotes an ink cartridge, 22 denotes a carriage axis, and 23 denotes a carriage.

<Ink Cartridge>

The ink of the present invention or pretreatment liquid can be accommodated in a cartridge container, and the ink cartridge may be further equipped with suitably selected other members.

The container is suitably selected depending on the intended purpose without any restriction in the shape, structure, size, and material thereof. Suitable examples of the container include those having an ink bag formed of an aluminum laminate film or resin film.

An embodiment of the ink cartridge for the ink or pretreatment liquid will be explained hereinafter with reference to FIG. 2.

Figure 2:
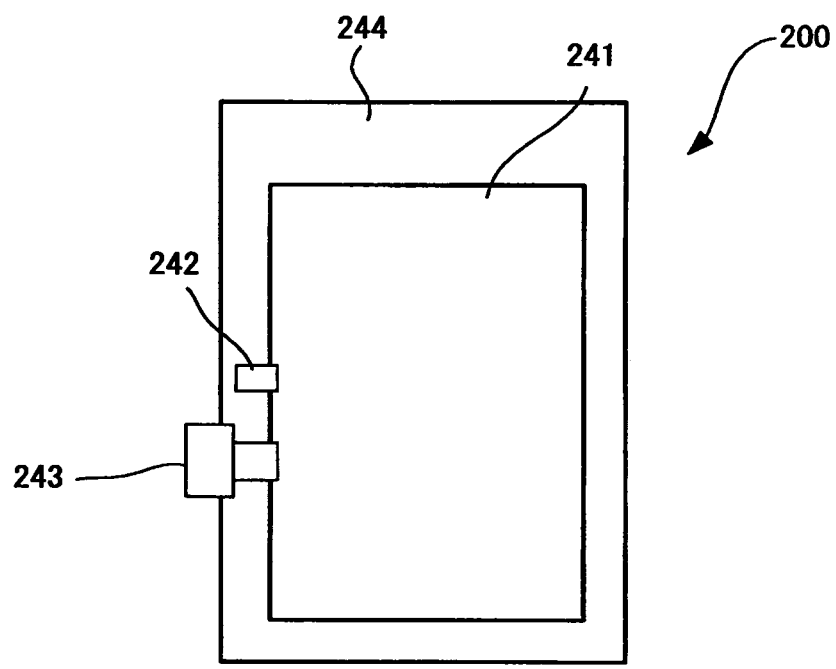
FIG. 2 is a schematic view showing an ink cartridge in which an ink-storing bag is accommodated in a cartridge case.

FIG. 2 is a schematic diagram showing an ink cartridge 200 in which an ink-storing bag 241 is accommodated in a cartridge case 244. An ink or pretreatment liquid is introduced into the ink-storing bag 241 from an inlet 242, followed by releasing the air remained in the ink-storing bag 241, and then the ink-storing bag 241 is sealed by closing the inlet 242 with heat. When the ink cartridge is used, the ink cartridge is set in the device by inserting a needle equipped with the body of the device into an outlet 243 formed of a rubber member to supply the ink to the device. The ink-storing bag 241 is formed of a wrapping member such as an aluminum laminate film. This ink-storing bag 241 is accommodated in the cartridge case 244, generally formed of a plastic, and as the ink cartridge 200, it is detachably mounted to various inkjet recording devices.

<Recorded Matter>

The recorded matter of the present invention contains a recording medium, and an image formed on the recording medium with the ink for inkjet recording of the present invention.

EXAMPLES

Examples and Comparative Examples of the present invention will be specifically explained hereinafter, but these examples shall not be construed as to limit the scope of the present invention. Note that, "part(s)" described in the following means "part(s) by mass".

Each pigment dispersion liquid was prepared as follows.

<Pigment Dispersion Liquid (Fluid Containing Dispersed Particles A) A1>

(Materials for Dispersion Liquid)

| | |
|---|---|
| C.I. Pigment Red 122 (Jet Magenta DMQ, Chiba Specialty Chemicals) | 15.0 parts |

-continued

| | |
|---|---|
| Surfactant (dispersing agent) expressed by the following structural formula 2 | 5.0 parts |
| Ion-exchanged water | 80.0 parts |

Structural Formula 2

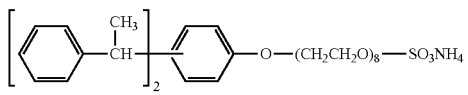

The surfactant (dispersing agent) expressed by the structural formula 2 was added to water and dissolved therein, followed by adding the organic pigment therein, mixing and stirring to thereby sufficiently wet the pigment. Then, the mixture was kneaded at 2,000 rpm for 60 minutes using DYNO-Mill KDL A (manufactured by WAB), which was a kneading device filled with zirconium beads each having a diameter of 0.5 mm.

Then, the mill base was taken out from the device, and filtered through a filter having a pore diameter of 1 μm, to thereby obtain a magenta pigment dispersion liquid (fluid containing dispersed particles A) A1 having a pigment concentration of 15% by mass.

<Pigment Dispersion Liquid (Fluid Containing Dispersed Particles A) A2 to A15>

Pigment Dispersion Liquids A2 to A15 each having a pigment concentration of 15% by mass were respectively obtained in the same manner as in Pigment Dispersion Liquid (fluid containing dispersed particles A) A1, provided that the organic pigment and surfactant (dispersing agent) used therein were changed as listed in Table 1.

TABLE 1

| Dispersion liquid | Pigment C.I. No. (Pigment) | Manufacture | Product name | Dispersing agent |
|---|---|---|---|---|
| A1 | Red 122 | Chiba Specialty Chemicals | Jet Magenta DMQ | Structural Formula 2 |
| A2 | Blue 15:4 | BASF JAPAN | HELIOGEN Blue D7107 | |
| A3 | Yellow 155 | Clariant JAPAN | TONER Yellow 3GP | |
| A4 | Red 122 | Chiba Specialty Chemicals | Jet Magenta DMQ | Structural Formula 3 |
| A5 | Blue 15:4 | BASF JAPAN | HELIOGEN Blue D7107 | |
| A6 | Yellow 155 | Clariant JAPAN | TONER Yellow 3GP | |
| A7 | Red 122 | Clariant JAPAN | HOSTAPERM PINK EB TRANS. | Structural Formula 4 |
| A8 | Blue 15:3 | Chiba Specialty Chemicals | CROMOPHTAL Cyan GLX | |
| A9 | Yellow 74 | Clariant JAPAN | HANSA Yellow 5GX01 | |
| A10 | Red 122 | Clariant JAPAN | HOSTAPERM PINK EB TRANS. | Structural Formula 5 |
| A11 | Blue 15:3 | Chiba Specialty Chemicals | CROMOPHTAL Cyan GLX | |
| A12 | Yellow 74 | Clariant JAPAN | HANSA Yellow 5GX01 | |
| A13 | Violet 19 | Chiba Specialty Chemicals | CINQUASIA PACIFIC Red 2020 | Structural Formula 6 |
| A14 | Blue 15:3 | BASF JAPAN | HELIOGEN Blue D7079 | |
| A15 | Yellow 74 | Clariant JAPAN | HANSA Yellow 5GX01 | |

The structural formulae 3 to 6 listed in Table 1 are as follows:

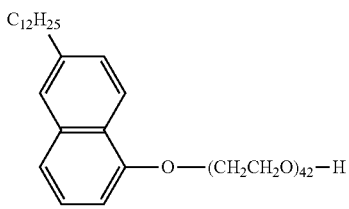
Structural Formula 3

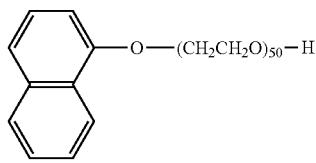
Structural Formula 4

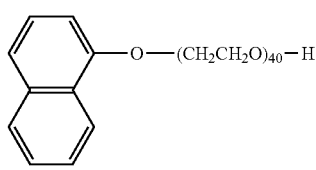
Structural Formula 5

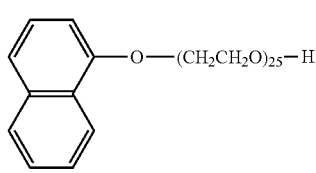
Structural Formula 6

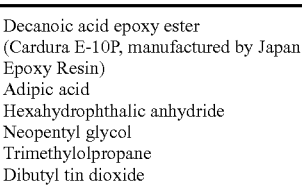

<Pigment Dispersion Liquid (Fluid Containing Dispersed Particles B) B1>
1. Synthesis of Polymer (a)
[Starting Materials of Polymer (a)]

| | |
|---|---|
| Decanoic acid epoxy ester (Cardura E-10P, manufactured by Japan Epoxy Resin) | 10.0 parts by mass |
| Adipic acid | 27.0 parts by mass |
| Hexahydrophthalic anhydride | 42.0 parts by mass |
| Neopentyl glycol | 2.0 parts by mass |
| Trimethylolpropane | 26.0 parts by mass |
| Dibutyl tin dioxide | 0.1 parts by mass |

A 2 L four-necked flask equipped with a drying tube, thermometer, nitrogen-gas inlet tube and stirrer was charged with the aforementioned materials, and the temperature thereof was elevated to 180° C. over 3 hours while dewatering to thereby allow then to proceed with a condensation reaction. As a result, a polymer (a) (polyester resin) was obtained.
2. Preparation of Pigment Dispersion Liquid (Fluid Containing Dispersed Particles B) B1
(Materials for Dispersion Liquid)

| | |
|---|---|
| C.I. Pigment Red 122 (Jet Magenta DMQ, Chiba Specialty Chemicals) | 12.0 parts |
| Polymer (a) | 15.0 parts |
| 2-amino-2-methyl-1,3-propanediol | 1.0 part |
| Ion-exchanged water | 72.0 parts |

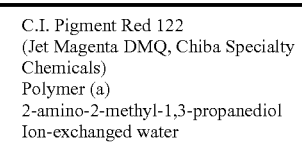

Pigment Dispersion Liquid (fluid containing dispersed particles B) B1 was prepared with the aforementioned materials.

Specifically, Polymer (a) was dissolved in water to which 2-amino-2-methyl-1,3-propanediol had been added, followed by adding the pigment therein, mixing and stirring to thereby sufficiently wet the pigment. Then, the mixture was kneaded at 2,000 rpm for 40 minutes using DYNO-Mill KDL A (manufactured by WAB), which was a kneading device filled with zirconium beads having a diameter of 0.5 mm.

Then, 3 parts of 1N chloric acid was added to the kneaded mill base and stirred. To this mixture, 400 parts of ion-exchanged water was added and sufficiently stirred. Then, this mixture was separated into the pigment paste and water using a centrifuge, and supernatant was removed. This procedure was repeated several times.

Thereafter, 2-amino-2-methyl-1,3-propanediol was added thereto as a base compound, and again kneaded by the aforementioned kneading device. The mill base was taken out, and filtered through a filter having a pore diameter of 1 μm to thereby obtain a magenta pigment dispersion liquid (fluid containing dispersed particles B) B1 having a pigment concentration of 15% by mass.

<Pigment Dispersion Liquid (Fluid Containing Dispersed Particles B) B2, B3>

Pigment Dispersion Liquids (fluid containing dispersed particles B) B2 and B3 each having a pigment concentration of 15% by mass were prepared in the same manner as the method for preparing Pigment Dispersion Liquid (fluid containing dispersed particles B) B1, provided that the pigment was replaced with those presented in Table 2.

<Pigment Dispersion Liquid (Fluid Containing Dispersed Particles B) B4>

1. Synthesis of Polymer (b)

[Starting Materials 1 of Polymer (b)]

| | |
|---|---|
| Styrene | 11.2 parts |
| Acrylic acid | 2.8 parts |
| Lauryl methacrylate | 12.0 parts |
| Polyethylene glycol methacrylate | 4.0 parts |
| Styrene macromer (AS-6, Toagosei Co., Ltd.) | 4.0 parts |
| Mercaptoethanol | 0.4 parts |

[Starting Materials 2 of Polymer (b)]

| | |
|---|---|
| Styrene | 100.8 parts |
| Acrylic acid | 25.2 parts |
| Lauryl methacrylate | 108.0 parts |
| Polyethylene glycol methacrylate | 36.0 parts |
| Hydroxyethyl methacrylate | 60.0 parts |
| Styrene macromer (AS-6, Toagosei Co., Ltd.) | 36.0 parts |
| Mercaptoethanol | 3.6 parts |
| Azobisdimethyl valeronitrile | 2.4 parts |
| Methylethyl ketone | 18.0 parts |

After replacing an inner atmosphere of a 1L-flask equipped with a mechanical stirrer, thermometer, nitrogen gas inlet tube, reflux tube, and dropping funnel, the flask was charged with the starting materials 1 of Polymer (b), and the temperature was elevated to 65° C., followed by dropping the mixed solution of the starting materials 2 of Polymer (b) into the heated flask over 2.5 hours.

After the completion of the dropping, a mixed solution of azobisdimethyl valeronitrile (0.8 parts), and methylethyl ketone (18.0 parts) was dropped into the flask over 0.5 hours, matured at 65° C. for 1 hour. Thereafter, 0.8 parts of azobisdimethyl valeronitrile was added therein, and the mixture was further matured for 1 hour.

After the reaction, 364.0 parts of methylethyl ketone was added into the flask, to thereby obtain 800 parts of a polymer (b) (vinyl resin) solution having a concentration of 50% by mass.

2. Preparation of Pigment Dispersion Liquid (Fluid Containing Dispersed Particles B) B4

A dispersion liquid was prepared using the following materials including the polymer (b) solution.

Specifically, after sufficiently stirring the pigment and the polymer (b) solution, the mixture was kneaded 20 times by a three-roll mill (NR-84A, manufactured by Noritake Co., Limited).

The thus obtained paste was added to 200 parts of ion-exchanged water, and methylethyl ketone and water were removed from the mixture using an evaporator, to thereby obtain a magenta dispersion liquid B4 having a pigment concentration of 15% by mass.

(Materials of Dispersion Liquid)

| | |
|---|---|
| C.I. Pigment Violet 19 (CINQUASIA PACIFIC Red 2020, Chiba Specialty Chemicals) | 26.0 parts |
| Polymer (b) solution (concentration: 50% by mass) | 28.0 parts |
| 1 mol/L potassium hydroxide solution | 13.6 parts |
| Methylethyl ketone | 20.0 parts |
| Ion-exchanged water | 30.0 parts |

<Pigment Dispersion Liquid (Fluid Containing Dispersed Particles B) B5 to B9>

Pigment Dispersion Liquids (fluid containing dispersed particles B) B5 to B9 each having a pigment concentration of 15% by mass were obtained in the same manner as the method for preparing Pigment Dispersion Liquid (fluid containing dispersed particles B) B4, provided that the pigment was changed to those listed in Table 2.

TABLE 2

| Dispersion liquid | Pigment C.I. No. (Pigment) | Manufacture | Product name | Coating polymer |
|---|---|---|---|---|
| B1 | Red 122 | Chiba Specialty Chemicals | Jet Magenta DMQ | Polymer (a) |
| B2 | Blue 15:4 | BASF JAPAN | HELIOGEN Blue D7107 | |
| B3 | Yellow 155 | Clariant JAPAN | TONER Yellow 3GP | |
| B4 | Violet 19 | Chiba Specialty Chemicals | CINQUASTA PACIFIC Red 2020 | Polymer (b) |
| B5 | Blue 15:3 | BASF JAPAN | HELIOGEN Blue D7079 | |
| B6 | Yellow 74 | Clariant JAPAN | HANZA Yellow 5GX01 | |
| B7 | Red 122 | Clariant JAPAN | HOSTAPERM PINK EB TRANS. | |
| B8 | Blue 15:3 | Chiba Specialty Chemicals | CROMOPHTAL Cyan GLX | |
| B9 | Yellow 74 | Clariant JAPAN | HANSA Yellow 5GX01 | |

Example 1

Formulation of Ink

| | |
|---|---|
| Pigment Dispersion Liquid (fluid containing dispersed particles A) A1 | 20.0 parts |
| Pigment Dispersion Liquid (fluid containing dispersed particles B) B1 | 20.0 parts |
| DISPANOL TOC (polyoxyethylene alkylene derivative, solid content: 100% by mass, NOF Corporation) | 1.5 parts |
| Glycerin | 15.0 parts |
| 3-methyl-1,3-butandiol | 15.0 parts |
| 2,2,4-trimethyl-1,3-pentanediol | 2.0 parts |
| Triethanol amine | 0.2 parts |
| Proxel LV (antiseptic-antifungal agent, Avecia Ltd.) | 0.1 parts |
| Ion-changed water | 26.2 parts |

After dissolving the aforementioned materials in ion-exchanged water, the solution was filtered through a filter having a pore diameter of 1 μm to thereby obtain a magenta ink for inkjet recording.

Example 2

A cyan ink for inkjet recording was obtained in the same manner as in Example 1, provided that Pigment Dispersion Liquid (fluid containing dispersed particles A) A1 and Pigment Dispersion Liquid (fluid containing dispersed particles B) B1 were respectively replaced with Pigment Dispersion Liquid (fluid containing dispersed particles A) A2 and Pigment Dispersion Liquid (fluid containing dispersed particles B) B2.

Example 3

A yellow ink for inkjet recording was obtained in the same manner as in Example 1, provided that Pigment Dispersion Liquid (fluid containing dispersed particles A) A1 and Pigment Dispersion Liquid (fluid containing dispersed particles B) B1 were respectively replaced with Pigment Dispersion Liquid (fluid containing dispersed particles A) A3 and Pigment Dispersion Liquid (fluid containing dispersed particles B) B3.

Example 4

Formulation of Ink

| | |
|---|---|
| Pigment Dispersion Liquid (fluid containing dispersed particles A) A4 | 32.0 parts |
| Pigment Dispersion Liquid (fluid containing dispersed particles B) B4 | 8.0 parts |
| W-5661 (polyurethane resin emulsion, solid content: 35% by mass, Mitsui Chemicals, Inc.) | 1.0 part |
| SOFTANOL EP5035 (polyoxyalkylene alkyl ether, solid content: 100% by mass, Nippon Shokubai Co., Ltd.) | 1.0 part |
| Glycerin | 14.0 parts |
| 1,3-butanediol | 14.0 parts |
| 2-ethyl-1,3-hexanediol | 2.5 parts |
| Triethanol amine | 0.2 parts |
| Proxel LV (antiseptic-antifungal agent, Avecia Ltd.) | 0.1 parts |
| Ion-exchanged water | 27.2 parts |

After dissolving the aforementioned materials in ion-exchanged water, the solution was filtered through a filter having a pore diameter of 1 μm to thereby obtain a magenta ink for inkjet recording.

Example 5

A cyan ink for inkjet recording was obtained in the same manner as in Example 4, provided that Pigment Dispersion Liquid (fluid containing dispersed particles A) A4 and Pigment Dispersion Liquid (fluid containing dispersed particles B) B4 were respectively replaced with Pigment Dispersion Liquid (fluid containing dispersed particles A) A5 and Pigment Dispersion Liquid (fluid containing dispersed particles B) B5.

Example 6

A yellow ink for inkjet recording was obtained in the same manner as in Example 4, provided that Pigment Dispersion Liquid (fluid containing dispersed particles A) A4 and Pigment Dispersion Liquid (fluid containing dispersed particles B) B4 were respectively replaced with Pigment Dispersion Liquid (fluid containing dispersed particles A) A6 and Pigment Dispersion Liquid (fluid containing dispersed particles B) B6.

Example 7

Formulation of Ink

| | |
|---|---|
| Pigment Dispersion Liquid (fluid containing dispersed particles A) A7 | 28.0 parts |
| Pigment Dispersion Liquid (fluid containing dispersed particles B) B7 | 12.0 parts |
| KF-353 (polyester-modified silicone oil, solid content: 100% by mass, Sin-Etsu Chemical Co., Ltd.) | 0.1 parts |
| ZONYL FS-300 (polyoxyalkylene (C2-3)-2-perfluoroalkyl(C4-16)ethyl ether, solid content: 40% by mass, Du Pont Kabushiki Kaisha) | 1.3 parts |
| Glycerin | 17.0 parts |
| 1,3-butanediol | 17.0 parts |
| 2-ethyl-1,3-hexanediol | 2.0 parts |
| 2-amino-2-ethyl-1,3-propanediol | 0.2 parts |
| Proxel LV (antiseptic-antifungal agent, Avecia Ltd.) | 0.1 parts |
| Ion-exchanged water | 22.3 parts |

After dissolving the aforementioned materials in ion-exchanged water, the solution was filtered through a filter having a pore diameter of 1 μm to thereby obtain a magenta ink for inkjet recording.

Example 8

A cyan ink for inkjet recording was obtained in the same manner as in Example 7, provided that Pigment Dispersion Liquid (fluid containing dispersed particles A) A7 and Pigment Dispersion Liquid (fluid containing dispersed particles B) B7 were respectively replaced with Pigment Dispersion Liquid (fluid containing dispersed particles A) A8 and Pigment Dispersion Liquid (fluid containing dispersed particles B) B8.

Example 9

A yellow ink for inkjet recording was obtained in the same manner as in Example 7, provided that Pigment Dispersion Liquid (fluid containing dispersed particles A) A7 and Pigment Dispersion Liquid (fluid containing dispersed particles B) B7 were respectively replaced with Pigment Dispersion Liquid (fluid containing dispersed particles A) A9 and Pigment Dispersion Liquid (fluid containing dispersed particles B) B9.

Example 9-2

A magenta ink for inkjet recording was obtained in the same manner as in Example 4, provided that Pigment Dispersion Liquid (fluid containing dispersed particles A) A4 was replaced with Pigment Dispersion Liquid (fluid containing dispersed particles A) A10.

Example 9-3

A cyan ink for inkjet recording was obtained in the same manner as in Example 5, provided that Pigment Dispersion Liquid (fluid containing dispersed particles A) A5 was replaced with Pigment Dispersion Liquid (fluid containing dispersed particles A) A11.

Example 9-4

A yellow ink for inkjet recording was obtained in the same manner as in Example 6, provided that Pigment Dispersion Liquid (fluid containing dispersed particles A) A6 was replaced with Pigment Dispersion Liquid (fluid containing dispersed particles A) A12.

Example 9-5

A magenta ink for inkjet recording was obtained in the same manner as in Example 7, provided that Pigment Dispersion Liquid (fluid containing dispersed particles A) A7 was replaced with Pigment Dispersion Liquid (fluid containing dispersed particles A) A13.

Example 9-6

A cyan ink for inkjet recording was obtained in the same manner as in Example 8, provided that Pigment Dispersion Liquid (fluid containing dispersed particles A) A8 was replaced with Pigment Dispersion Liquid (fluid containing dispersed particles A) A14.

Example 9-7

A yellow ink for inkjet recording was obtained in the same manner as in Example 9, provided that Pigment Dispersion Liquid (fluid containing dispersed particles A) A9 was replaced with Pigment Dispersion Liquid (fluid containing dispersed particles A) A15.

Example 10

Formulation of Pretreatment Liquid

| | |
|---|---|
| Succinic acid | 10.0 parts |
| Glycerin | 10.0 parts |
| 1,3-butanediol | 10.0 parts |
| ZONYL FS-300 (polyoxyalkylene (C2-3)-2-perfluoroalkyl(C4-16)ethyl ether, solid content: 40% by mass, Du Pont Kabushiki Kaisha) | 1.3 parts |
| Triethanol amine | 2.0 parts |
| Ion-exchanged water | 66.7 parts |

After dissolving the aforementioned materials in ion-exchanged water, the solution was filtered through a filter having a pore diameter of 5 µm to thereby obtain a pretreatment liquid for inkjet recording.

Example 11

A pretreatment liquid for inkjet recording of Example 11 was obtained in the same manner as in Example 10, provided that succinic acid was replaced with citric acid.

Example 12

A pretreatment liquid for inkjet recording of Example 12 was obtained in the same manner as in Example 10, provided that succinic acid was replaced with lactic acid.

Example 13

A pretreatment liquid for inkjet recording of Example 13 was obtained in the same manner as in Example 10, provided that succinic acid was replaced with tartaric acid.

Example 14

A pretreatment liquid for inkjet recording of Example 14 was obtained in the same manner as in Example 10, provided that succinic acid was replaced with malic acid.

Example 15

A pretreatment liquid for inkjet recording of Example 15 was obtained in the same manner as in Example 10, provided that succinic acid was replaced with calcium chloride.

Example 16

A pretreatment liquid for inkjet recording of Example 16 was obtained in the same manner as in Example 10, provided that succinic acid was replaced with magnesium sulfate.

<Pigment Dispersion Liquid C1>

After sufficiently mixing 300 g of C.I. Pigment Blue 15:3 (HELIOGEN Blue D7079. BASF Japan) in 1,000 g of water, 450 g of sodium hypochlorite (effective chlorine concentration: 12 mol. %) was dropped therein, stirred at 100° C. to 105° C. for 8 hours.

To this liquid, 100 g of sodium hypochlorite (effective chlorine concentration: 12 mol. %) was added, and dispersed at 2,000 rpm for 2 hours by using DYNO-Mill KDL A (manufactured by WAB), which was filled with zirconium beads having a diameter of 0.5 mm.

The obtained slurry was diluted 10-fold, and the pH value thereof was adjusted with lithium hydroxide, then the solution was desalinated and condensed to have electric conductivity of 0.2 mS/cm using an ultrafilter.

Moreover, coarse particles were removed therefrom by centrifugation, filtered through a filter having a pore diameter of 1 µm to thereby obtain a cyan pigment dispersion liquid C1 having a pigment concentration of 15% by mass.

<Pigment Dispersion Liquid C2>
(Materials of Dispersion Liquid)

| | |
|---|---|
| C.I. Pigment Red 122 (Jet Magenta DMQ, Chiba Specialty Chemicals) | 15.0 parts |
| JONCRYL 819 (styrene-acryl polymer dispersing agent, BASF Japan) | 5.0 parts |
| Ion-exchanged water | 80.0 parts |

The aforementioned polymer dispersing agent was added to and dissolved in water, followed by mixing the pigment therein and stirring. After the pigment was sufficiently wet, the mixture was kneaded at 2,000 rpm for 60 minutes using DYNO-Mill KDL A (manufactured by WAB), which was a kneading device filled with zirconium beads having a diameter of 0.5 mm.

Then, the mill base was taken out, filtered through a filter having a pore diameter of 1 μm, to thereby obtain a magenta pigment dispersion liquid C2 having a pigment concentration of 15% by mass.

Comparative Example 1

A yellow ink for inkjet recording of Comparative Example 1 was obtained in the same manner as in Example 3, provided that the amount of Pigment Dispersion Liquid (fluid containing dispersed particles A) A3 was increased to 40 parts, and the amount of Pigment Dispersion Liquid (fluid containing dispersed particles B) B3 was changed to 0 part.

Comparative Example 2

A yellow ink for inkjet recording of Comparative Example 2 was obtained in the same manner as in Example 3, provided that the amount of Pigment Dispersion Liquid (fluid containing dispersed particles A) A3 was changed to 0 part, and the amount of Pigment Dispersion Liquid (fluid containing dispersed particles B) B3 was increased to 40 parts.

Comparative Example 3

A cyan ink for inkjet recording of Comparative Example 3 was obtained in the same manner as in Example 5, provided that Pigment Dispersion Liquid (fluid containing dispersed particles B) B5 was changed to Pigment Dispersion Liquid (fluid containing dispersed particles) C1, and the amounts of glycerin and 1,3-butanediol were both reduced from 1.4 parts to 12.0 parts.

Comparative Example 4

A cyan ink for inkjet recording of Comparative Example 4 was obtained in the same manner as in Example 5, provided that Pigment Dispersion Liquid (fluid containing dispersed particles A) A5 was changed to Pigment Dispersion Liquid (fluid containing dispersed particles) C1.

Comparative Example 5

A magenta ink for inkjet recording of Comparative Example 5 was obtained in the same manner as in Example 7, provided that Pigment Dispersion Liquid (fluid containing dispersed particles A) A7 was changed to Pigment Dispersion Liquid (fluid containing dispersed particles) C2, and the amounts of glycerin and 1,3-butanediol were both reduced from 17.0 parts to 14.0 parts.

Example 17

Formulation of Pretreatment Liquid

| | |
|---|---|
| POLYMARON 360 (cationic polymer, solid content: 20% by mass, Arakawa Chemical Industries, Ltd.) | 30.0 parts |
| Glycerin | 10.0 parts |
| 1,3-butanediol | 10.0 parts |
| ZONYL FS-300 (polyoxyalkylene (C2-3)-2-perfluoroalkyl(C4-16)ethyl ether, solid content: 40% by mass, Du Pont Kabushiki Kaisha) | 1.3 parts |
| Ion-exchanged water | 48.7 parts |

After dissolving the aforementioned materials in ion-exchanged water, the solution was filtered through a filter having a pore diameter of 5 μm to thereby obtain a pretreatment liquid for inkjet recording.

To an inkjet printer IPSiO G707 (Ricoh Company Limited) having the structure of FIG. 1, an ink cartridge in which each ink and pretreatment liquid of the aforementioned examples and comparative examples was set. After applying the pretreatment liquid to a test paper (recording medium), each ink was jetted to the test paper (recording medium). The obtained recorded matter was measured and evaluated in terms of color saturation (coloring performance), abrasion resistance, and color bleeding, in the following manners.

Note that, Example 18 was the example where no pretreatment liquid was applied.

1. Color Saturation

A solid image was printed on a test paper, My Paper (Ricoh Company Limited) and POD Gloss 100 (Oji Paper Co., Ltd.), at the condition of one-pass. After drying the printed image, L*a*b* values of the image was measured by a reflection color spectrodensitometer (X-Rite), a ratio of the measured color saturation value (an average value between two test papers) to a color saturation value (yellow: 91.34, magenta: 74.55, cyan: 62.82) of a standard color (Japan color ver. 2) was calculated, and evaluated based on the following evaluation criteria. The results are shown in Table 3, and only A and B are acceptable.

[Evaluation Criteria]
A: 1.2 or more
B: 1.0 or more but less than 1.2
C: 0.8 or more but less than 1.0
D: less than 0.8

TABLE 3

| | Color saturation | Pretreatment liquid | | | | | | | | |
|---|---|---|---|---|---|---|---|---|---|---|
| | | Ex. 10 | Ex. 11 | Ex. 12 | Ex. 13 | Ex. 14 | Ex. 15 | Ex. 16 | Ex. 17 | Ex. 18 |
| Ink | Ex. 1 | A | A | A | A | A | A | A | A | B |
| | Ex. 2 | A | A | A | A | A | A | A | A | B |
| | Ex. 3 | A | A | A | A | A | A | A | A | B |
| | Ex. 4 | A | A | A | A | A | A | A | A | B |
| | Ex. 5 | A | A | A | A | A | A | A | A | B |
| | Ex. 6 | A | A | A | A | A | A | A | A | B |
| | Ex. 7 | A | A | A | A | A | A | A | A | B |
| | Ex. 8 | A | A | A | A | A | A | A | A | B |
| | Ex. 9 | A | A | A | A | A | A | A | A | B |
| | Ex. 9-2 | A | A | A | A | A | A | A | B | B |
| | Ex. 9-3 | A | A | A | A | A | A | A | B | B |
| | Ex. 9-4 | A | A | A | A | A | A | A | B | B |
| | Ex. 9-5 | A | A | A | A | A | A | A | A | B |
| | Ex. 9-6 | A | A | A | A | A | A | A | A | A |
| | Ex. 9-7 | A | A | A | A | A | A | A | B | A |
| | Comp. Ex. 1 | D | D | D | D | D | B | B | D | C |
| | Comp. Ex. 2 | B | B | B | B | B | B | B | B | C |
| | Comp. Ex. 3 | D | D | D | D | D | C | C | D | C |
| | Comp. Ex. 4 | D | D | C | C | C | B | B | D | C |
| | Comp. Ex. 5 | B | B | B | B | B | B | B | B | C |

2. Abrasion Resistance

An image sample was formed using a test paper, My Paper (Ricoh Company Limited) and POD Gloss 100 (Oji Paper Co., Ltd.). After leaving the image sample in the condition such that the temperature was 25° C. and RH was 50% for 24 hours to dry the image sample, the printed portion of the image sample was rubbed forwards and backwards 5 times with a white cotton cloth with a load of 900 g, by means of a clock meter CM-1 (manufactured by Toyo Seiki Seisaku-Sho, Ltd.). The state of the image sample after being rubbed was evaluated based on the following evaluation criteria.

The results are shown in Table 4, and only A and B are acceptable.

<Evaluation Criteria>

A: No portion is missing from the image, and there is not smearing around the image.

B: Hardly any portion is missing from the image, and an extremely low level of smearing around the image can be found by visual observation.

C: Hardly any portion is missing from the image, but some smearing around the image can be found by visual observation.

D: Significant levels of missing portions of the image and smearing around the image can be found by visual observation.

TABLE 4

| Abrasion resistance | | Pretreatment liquid | | | | | | | | |
|---|---|---|---|---|---|---|---|---|---|---|
| | | Ex. 10 | Ex. 11 | Ex. 12 | Ex. 13 | Ex. 14 | Ex. 15 | Ex. 16 | Ex. 17 | Ex. 18 |
| Ink | Ex. 1 | A | A | A | A | A | A | A | B | A |
| | Ex. 2 | A | A | A | A | A | A | A | A | A |
| | Ex. 3 | A | A | A | A | A | A | A | A | A |
| | Ex. 4 | A | A | A | A | A | A | A | B | B |
| | Ex. 5 | A | A | A | A | A | A | A | B | B |
| | Ex. 6 | A | A | A | A | A | A | A | B | B |
| | Ex. 7 | A | A | A | A | A | A | A | A | A |
| | Ex. 8 | A | A | A | A | A | A | A | A | A |
| | Ex. 9 | A | A | A | A | A | A | A | B | A |
| | Ex. 9-2 | A | A | A | A | A | A | A | B | B |
| | Ex. 9-3 | A | A | A | A | A | A | A | B | B |
| | Ex. 9-4 | A | A | A | A | A | A | A | B | B |
| | Ex. 9-5 | A | A | A | A | A | A | A | A | B |
| | Ex. 9-6 | A | A | A | A | A | A | A | A | A |
| | Ex. 9-7 | A | A | A | A | A | A | A | B | A |
| | Comp. Ex. 1 | D | D | D | D | D | D | D | D | C |
| | Comp. Ex. 2 | C | C | C | C | C | B | C | C | B |
| | Comp. Ex. 3 | D | D | D | D | D | D | D | D | D |
| | Comp. Ex. 4 | D | C | C | C | D | D | D | D | D |
| | Comp. Ex. 5 | C | C | D | C | D | C | C | C | B |

3. Color Bleeding

A printing pattern in which characters of a black ink were printed in solid images of color inks, magenta, cyan, and yellow, was used, and this pattern was printed on a test paper, My Paper (Ricoh Company Limited). The printing conditions were as follows: 100% duty, recording density of 300 dpi, and one-pass printing.

A color bleeding between the color ink and black ink was visually observed and evaluated based on the following criteria. The results are shown in Table 5, and only A and B are acceptable.

[Evaluation Criteria]

A: Color bleeding has not occurred, and the black characters can be extremely clearly recognized.

B: Color bleeding has not occurred, and the black characters can be clearly recognized.

C: Color bleeding has slightly occurred, and the black characters are slightly blurred.

D: Color bleeding has occurred, and it is difficult to recognize the black characters.

TABLE 5

| Color bleeding | | Pretreatment liquid | | | | | | | | |
|---|---|---|---|---|---|---|---|---|---|---|
| | | Ex. 10 | Ex. 11 | Ex. 12 | Ex. 13 | Ex. 14 | Ex. 15 | Ex. 16 | Ex. 17 | Ex. 18 |
| Ink | Ex. 1 | A | A | A | A | A | A | A | B | B |
| | Ex. 2 | A | A | A | A | A | A | A | B | B |
| | Ex. 3 | A | A | A | A | A | A | A | B | B |
| | Ex. 4 | A | A | A | A | A | A | A | B | B |
| | Ex. 5 | A | A | A | A | A | A | A | B | B |
| | Ex. 6 | A | A | A | A | A | A | A | B | B |
| | Ex. 7 | A | A | A | A | A | A | A | B | B |
| | Ex. 8 | A | A | A | A | A | A | A | B | B |
| | Ex. 9 | A | A | A | A | A | A | A | B | B |
| | Ex. 9-2 | A | A | A | A | A | A | A | B | B |
| | Ex. 9-3 | A | A | A | A | A | A | A | B | B |
| | Ex. 9-4 | A | A | A | A | A | A | A | B | B |
| | Ex. 9-5 | A | A | A | A | A | A | A | B | B |
| | Ex. 9-6 | A | A | A | A | A | A | A | B | B |
| | Ex. 9-7 | A | A | A | A | A | A | A | B | B |
| | Comp. Ex. 1 | D | D | D | D | D | C | C | D | C |
| | Comp. Ex. 2 | B | B | B | B | B | C | C | C | B |
| | Comp. Ex. 3 | D | D | D | D | D | D | D | D | C |
| | Comp. Ex. 4 | D | C | D | C | C | B | B | C | B |
| | Comp. Ex. 5 | D | D | D | D | C | C | C | D | C |

REFERENCE SIGNS LIST

A Termination section for a pretreatment liquid application process
B Initial section for record scanning
1 Pretreatment liquid
2 Roller for controlling a film thickness
3 Fountain roller
4 Coating roller
5 Counter roller
6 Paper (recording medium)
7 Paper feeding roller
8 Paper feeding tray
11 Paper sending roller
12 Paper sending roller
13 Paper sending roller
14 Paper sending roller
15 Paper sending roller
16 Paper sending roller
17 Recording medium (paper)
18 Paper feeding roller
20 Recording head
21 Ink cartridge
22 Carriage axis
23 Carriage
42 Container for pretreatment liquid
200 Ink cartridge
241 Ink-storage bag
242 Inlet
243 Outlet
244 Cartridge case

The invention claimed is:
1. An ink, comprising:
dispersed particles A;
dispersed particles B;
a surfactant; and
water,
wherein the dispersed particles A are obtained by dispersing a first organic pigment in water in the presence of a surfactant,
the dispersed particles B are obtained by dispersing an at least partially polymer-coated second organic pigment in water, and
the first organic pigment and the second organic pigment can be the same or different.

2. The ink of claim 1, wherein the surfactant used for dispersing the first organic pigment of the dispersed particles A is a compound of formula 1:

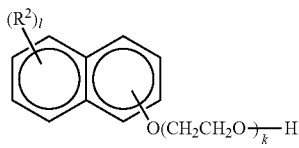

Formula 1 wherein $R^2$ is a C1-20 alkyl group, a C1-20 aralkyl group, or an allyl group;
l is an integer from 0 to 7; and
k is an integer from 20 to 80.

3. The ink of claim 2, wherein the surfactant used for dispersing the first organic pigment of the dispersed particles A is a compound of one of the following formulae 3 to 6:

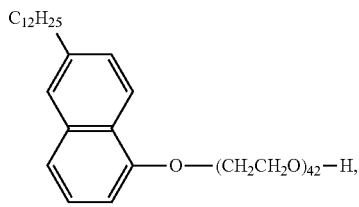

Formula 3 of formula 4:

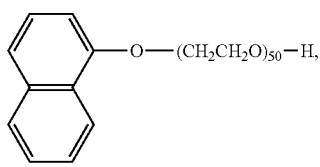

Formula 4 of formula 5:

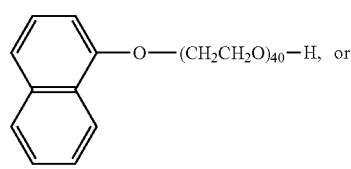

Formula 5 of formula 6:

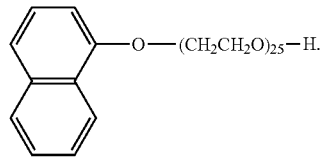

Formula 6

4. The ink of claim 1, wherein the surfactant used for dispersing the first organic pigment of the dispersed particles A is a compound of formula 2:

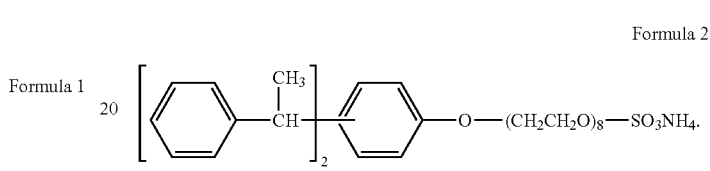

Formula 2

5. The ink of claim 1, wherein the polymer of the at least partially polymer-coated second organic pigment of the dispersed particles B is a vinyl polymer or a polyester polymer.

6. The ink of claim 1, further comprising a polyurethane resin emulsion that does not comprise organic pigment.

7. The ink of claim 1, further comprising a water-soluble solvent.

8. The ink of claim 7, wherein the water-soluble solvent comprises 1,3-butanediol, 3-methyl-1,3-butanediol, or both.

9. The ink of claim 7, wherein the water-soluble solvent comprises a polyhydric alcohol, a polyhydric alcohol alkyl ether, a polyhydric alcohol aryl ether, a nitrogen-containing heterocyclic compound, an amide, a amine, a sulfur-containing compound, a propylene carbonate, an ethylene carbonate, or mixtures thereof.

10. The ink of claim 1, further comprising C8-11 polyol.

11. The ink of claim 10, wherein the C8-11 polyol comprises 2-ethyl-1,3-hexanediol, 2,2,4-trimethyl-1,3-pentanediol, or both.

12. The ink of claim 1, wherein the first organic pigment is C.I. Pigment Yellow 74, 138, 150, 155, or 185; C.I. Pigment Red 122, 202, 208, or 209; C.I. Pigment Violet 19 or 23; C.I. Pigment Blue 15:3, 15:4, or 60; or C.I. Pigment Green 7 or 36.

13. The ink of claim 1, wherein the second organic pigment is C.I. Pigment Yellow 74, 138, 150, 155, or 185; C.I. Pigment Red 122, 202, 208, or 209; C.I. Pigment Violet 19 or 23; C.I. Pigment Blue 15:3, 15:4, or 60; or C.I. Pigment Green 7 or 36.

14. The ink of claim 1, wherein the first organic pigment and the second organic pigment are the same.

15. The ink of claim 1, wherein the first organic pigment and the second organic pigment are different.

16. The ink of claim 1, wherein an organic pigment concentration of the ink is from 2 to 15% by mass.

17. An inkjet recording method, comprising:
jetting the ink of claim 1 to a recording medium.

18. The method of claim 17, further comprising:
applying a pretreatment liquid to the recording medium before the jetting,
wherein the pretreatment liquid comprises water and a coagulating agent, and
wherein the coagulating agent is lactic acid, malic acid, tartaric acid, citric acid, or magnesium sulfate.

19. The method of claim 18,
wherein the applying and the jetting employ an inkjet recording device comprising an ink-jetting unit, and
wherein the jetting comprises applying a stimulus to the ink with the ink-jetting unit.

20. An ink cartridge, comprising:
a cartridge case; and
the ink of claim 1, housed in the cartridge case.

21. An ink, comprising:
dispersed particles A;
dispersed particles B;
a surfactant; and
water,
wherein the dispersed particles A are obtained by dispersing a first organic pigment in the presence of a surfactant,
the dispersed particles B are obtained by dispersing an at least partially polymer-coated second organic pigment, and
the first organic pigment and the second organic pigment can be the same or different.

* * * * *